United States Patent
Takahashi

[11] Patent Number: 5,818,641
[45] Date of Patent: Oct. 6, 1998

[54] IMAGE DISPLAY APPARATUS

[75] Inventor: Koichi Takahashi, Hachioji, Japan

[73] Assignee: Olympus Optical Co., Ltd., Tokyo, Japan

[21] Appl. No.: 733,011

[22] Filed: Oct. 16, 1996

[30] Foreign Application Priority Data

Oct. 16, 1995 [JP] Japan ................................. 7-266954

[51] Int. Cl.$^6$ .............................. G02B 27/14; G02B 5/04
[52] U.S. Cl. ................ 359/629; 359/831; 359/833; 359/837; 359/630; 359/631; 359/634
[58] Field of Search .................. 359/731, 831, 359/833–837, 629–633

[56] References Cited

U.S. PATENT DOCUMENTS

| | | | |
|---|---|---|---|
| 5,093,567 | 3/1992 | Staveley | 359/631 |
| 5,506,728 | 4/1996 | Edwards et al. | 359/633 |
| 5,539,578 | 7/1996 | Togino et al. | 359/630 |
| 5,546,227 | 8/1996 | Yasugaki et al. | 359/630 |
| 5,596,433 | 1/1997 | Konuma | 359/631 |

FOREIGN PATENT DOCUMENTS 3-101709  3/1992  Japan .

*Primary Examiner*—Frank G. Font
*Assistant Examiner*—Michael P. Stafira
*Attorney, Agent, or Firm*—Cushman Darby & Cushman IP Group of Pillsbury Madison & Sutro LLP

[57] ABSTRACT

An image display apparatus which enables observation of a clear image at a wide field angle and which is extremely small in size and light in weight. The apparatus includes an image display device (6) for displaying an image, and an ocular optical system (7) for leading the image displayed by the image display device (6) to an observer's eyeball (1). The ocular optical system (7) has a first surface 3, a second surface 4, and a third surface 5. A space formed by the three surfaces is filled with a transparent medium having a refractive index larger than 1. Light rays emitted from the image display device (6) pass through the third surface (5) and are internally reflected by the first surface (3) and further internally reflected by the second surface (4), which is decentered and has positive power. The reflected light rays pass through the first surface (3) and are led to the observer's eyeball (1). The angle $\theta_2$ formed between an axial principal ray after being reflected by the second surface (4) and a line normal to the second surface (4) at a point thereon where the axial principal ray is reflected satisfies the condition of $10° \leq \theta_2 \leq 40°$.

39 Claims, 9 Drawing Sheets

IMAGE DISPLAY APPARATUS

BACKGROUND OF THE INVENTION

The present invention relates to an image display apparatus and, more particularly, to a head- or face-mounted image display apparatus that can be retained on an observer's head or face.

As an example of conventional head- or face-mounted image display apparatus, an image display apparatus disclosed in Japanese Patent Application Unexamined Publication (KOKAI) No. 3-101709 (1991) is known. FIG. 14(*a*) shows the entire optical system of the conventional image display apparatus, and FIG. 14(*b*) shows a part of an ocular optical system used in the image display apparatus. As illustrated in these figures, in the conventional image display apparatus, an image that is displayed by an image display device is transmitted as an aerial image by a relay optical system including a positive lens, and the aerial image is projected into an observer's eyeball as an enlarged image by an ocular optical system including a concave reflecting mirror.

In an image display apparatus of the type wherein an image of an image display device is relayed, as shown in FIG. 14(*a*), however, several lenses must be used as a relay optical system in addition to an ocular optical system, regardless of the type of ocular optical system. Consequently, the optical path length increases, and the optical system increases in both size and weight.

When the ocular optical system alone is considered, as shown in FIG. 14(*b*), it may be conceived that the image display device is disposed in the vicinity of the position of a real image. Assuming that, in FIG. 14(*b*), the surface facing opposite and closer to the observer's pupil is a surface A, and the concave reflecting surface is a surface B, and further that the refracting surface closer to the real image P1 is a surface C:

① A point of intersection between the surfaces A and B is determined by the tilt angles of the surfaces A and B with respect to the observer's visual axis. If the point of intersection is formed at a position close to the observer's visual axis, a lower extra-axial ray L cannot exit from the ocular optical system. Accordingly, the position of the intersection point must be determined according to the field angle of the ocular optical system. In other words, the desired ocular optical system can be constructed only when the tilt angles of the surfaces A and B fall within a certain range varying according to the field angle.

② If the tilt angle of the surface A with respect to the observer's visual axis is large, or if the angle formed between the surface of the image display device and the observer's visual axis is small, the thickness in the direction of depth of the ocular optical system increases, causing the apparatus to increase in both overall size and weight. On the other hand, if the angle formed between the surface of the image display device and the observer's visual axis is large, the ocular optical system and the image display device are disposed vertically apart from each other. Consequently, when the apparatus is mounted on the observer's head, the amount to which the apparatus projects from the observer's face increases, resulting in an increase in the overall size of the apparatus.

SUMMARY OF THE INVENTION

In view of the above-described problems of the conventional technique, an object of the present invention is to provide an image display apparatus which enables observation of a clear image at a wide field angle and which is extremely small in size and light in weight.

To attain the above-described object, the present invention provides an image display apparatus including an image display device for displaying an image, and an ocular optical system for projecting the image displayed by the image display device and for leading the projected image to an observer's eyeball. The ocular optical system has at least three surfaces, and a space formed by the at least three surfaces is filled with a transparent medium having a refractive index larger than 1. The at least three surfaces are, in order from the observer's eyeball toward the image display device, a first surface serving as both a refracting surface and an internally reflecting surface, a second surface which is a reflecting surface of positive power facing the first surface and decentered or tilted with respect to an observer's visual axis, and a third surface which is a refracting surface closest to the image display device. The ocular optical system is arranged such that light rays emitted from the image display device pass through the third surface and are internally reflected by the first surface and further internally reflected by the second surface, and the reflected light rays pass through the first surface and are led to the observer's eyeball. The angle $\theta_2$ formed between an axial principal ray after being reflected by the second surface and a line normal to the second surface at a point thereon where the axial principal ray is reflected satisfies the following condition:

$$10° \leq \theta_2 \leq 40° \tag{1}$$

In this case, it is desirable that the angle $\theta_{1t}$ formed between the axial principal ray after passing through the first surface of the ocular optical system and a line normal to the first surface at a point thereon where the axial principal ray passes should satisfy the following condition:

$$-20° \leq \theta_{1t} \leq \approx° \tag{5}$$

In addition, the present invention provides an image display apparatus including an image display device for displaying an image, and an ocular optical system for projecting the image displayed by the image display device and for leading the projected image to an observer's eyeball. The ocular optical system has at least three surfaces, and a space formed by the at least three surfaces is filled with a transparent medium having a refractive index larger than 1. The at least three surfaces are, in order from the observer's eyeball toward the image display device, a first surface serving as both a refracting surface and an internally reflecting surface, a second surface which is a reflecting surface of positive power facing the first surface and decentered or tilted with respect to an observer's visual axis, and a third surface which is a refracting surface closest to the image display device. The ocular optical system is arranged such that light rays emitted from the image display device pass through the third surface and are internally reflected by the first surface and further internally reflected by the second surface, and the reflected light rays pass through the first surface and are led to the observer's eyeball. The angle $\theta_4$ formed between a line normal to the image display device and the observer's visual axis satisfies the following condition:

$$-20° \leq \theta_4 \leq 80° \tag{13}$$

The operation of the image display apparatus according to the present invention will be described below. The following description will be given by forward ray tracing in which light rays are traced from the image display device toward the observer's eyeball, unless otherwise specified.

A basic arrangement of the image display apparatus according to present invention is such as that shown in FIG. 1, which is a sectional view of Example 1 (described later). That is, the image display apparatus comprises an image display device 6 for displaying an image, and an ocular optical system 7 for projecting the image displayed by the image display device 6 and for leading the projected image to an observer's eyeball 1. The ocular optical system 7 has at least three surfaces 3, 4 and 5, and a space formed by the at least three surfaces is filled with a transparent medium having a refractive index larger than 1. The at least three surfaces are, in order from the observer's eyeball 1 toward the image display device 6, a first surface 3 serving as both a refracting surface and an internally reflecting surface, a second surface 4 which is a reflecting surface of positive power facing the first surface 3 and decentered or tilted with respect to an observer's visual axis 2, and a third surface 5 which is a refracting surface closest to the image display device 6. The angle $\theta_2$ formed between an axial principal ray after being reflected by the second surface 4 and a line normal to the second surface 4 at a point thereon where the axial principal ray is reflected satisfies the following condition:

$$10° \leq \theta_2 \leq 40° \tag{1}$$

In this case, the sign of the angle is positive when the axial principal ray or the observer's visual axis is counterclockwise relative to the line normal to the surface; it is negative when the axial principal ray or the observer's visual axis is clockwise relative to the line normal the surface. The same shall apply hereinafter for all surfaces.

The reasons for adopting the above-described arrangement are as follows. Firstly, if the angle $\theta_2$ exceeds the upper limit of the condition (1), i.e. 40°, the position of intersection between the first and second surfaces 3 and 4 at a side remote from the image display device 6 becomes closer to the observer's visual axis 2. Consequently, it becomes likely that an extra-axial ray H as shown in FIG. 1 will be unable to reach the observer's eyeball.

Secondly, the second surface 4 is a surface having the principal positive power in the ocular optical system 7. Therefore, it is essential in order to reduce aberrations in the entire optical system 7 to minimize the amount of aberration due to decentration at the second surface 4. Light rays incident on the third surface 5 of the ocular optical system 7 are internally reflected by the first surface 3 and then reflected by the second surface 4. If the angle of reflection at the second surface 4 exceeds the upper limit of the condition (1), i.e. 40°, aberrations due to decentration, particularly coma and astigmatism, produced by the second surface 4 become so large that they cannot be corrected by another surface of the ocular optical system 7. Therefore, it is impossible to project a clear image.

Meanwhile, after being reflected by the second surface 4, the light rays are incident on and refracted by the first surface 3 so as to be led to the observer's eyeball 1. At this time, the light rays must be incident on the first surface 3 at an angle at which the light rays are not totally reflected by the first surface 3. If the light rays are reflected by the second surface 4 at an angle smaller than the lower limit of the condition (1), i.e. 10°, the incident angle at the first surface 3 becomes larger than the critical angle. Accordingly, there is likelihood that light rays will be unable to emanate from the ocular optical system 7 to the observer's eyeball 1.

Incidentally, one of conditions necessary for giving powerful dynamic presence to the observer is to present a large image field to the observer, that is, to widen the field angle of the ocular optical system 7. However, as the field angle widens, the amount of aberration produced in the ocular optical system 7 increases. In particular, aberrations due to decentration markedly appear. In order to suppress the aberrations due to decentration, it is important to minimize the angle of reflection at the second surface 4. In other words, it is important that the angle $\theta_2$ formed between the axial principal ray after being reflected by the second surface 4 and a line normal to the second surface 4 at a point thereon where the axial principal ray is reflected should satisfy the following condition:

$$10° \leq \theta_2 \leq 30° \tag{2}$$

When it is intended to obtain an ocular optical system 7 of wide field angle, if $\theta_2$ exceeds the upper limit of the condition (2), i.e. 30°, aberrations due to the decentration of the second surface 4 become so large that they are difficult to correct by another surface. If $\theta_2$ is smaller than the lower limit of the condition (2), i.e. 10°, it becomes likely that light rays will be unable to emanate from the ocular optical system 7 to the observer's eyeball, as has been described above.

In order to project an image of high resolution at a wide field angle, it is desirable that the angle $\theta_2$ formed between the axial principal ray after being reflected by the second surface 4 and a line normal to the second surface 4 at a point thereon where the axial principal ray is reflected should satisfy the following condition:

$$10° \leq \theta_2 \leq 20° \tag{3}$$

If $\theta_2$ exceeds the upper limit of the condition (3), i.e. 20°, comatic aberration due to the decentration of the second surface 4 affects the resolution. If $\theta_2$ is smaller than the lower limit of the condition (3), i.e. 10°, it becomes likely that light rays will be unable to emanate from the ocular optical system 7 to the observer's eyeball, as has been described above.

In order to separate a reflecting region of the first surface 3 which internally reflects the light rays passing through the third surface 5 and a transmitting region of the first surface 3 which transmits the light rays reflected by the second surface 4 to project them into the observer's eyeball 1, it is important that the angle $\theta_2$ formed between the axial principal ray after being reflected by the second surface 4 and a line normal to the second surface 4 at a point thereon where the axial principal ray is reflected should satisfy the following condition:

$$20° \leq \theta_2 \leq 35° \tag{4}$$

If $\theta_2$ is smaller than the lower limit of the condition (4), i.e. 20°, the angle of reflection is small, so that the reflecting and transmitting regions overlap each other. If $\theta_2$ exceeds the upper limit of the condition (4), i.e. 35°, the amount of aberration due to decentration increases, as has been described above.

In construction of the ocular optical system 7, it is important that the angle $\theta_{1t}$ formed between the axial principal ray after passing through the first surface 3 of the ocular optical system 7 and a line normal to the first surface 3 at a point thereon where the axial principal ray passes should satisfy the following condition:

$$-20° \leq \theta_{1t} \leq 25° \tag{5}$$

If $\theta_{1r}$ is smaller than the lower limit of the condition (5), i.e. −20°, the first and second surfaces 3 and 4 undesirably overlap each other at a side remote from the image display device 6 and at a position close to the observer's visual axis 2. Consequently, it is likely that the marginal ray H as shown in FIG. 1 will not reach the observer. On the other hand, if $\theta_{1r}$ exceeds the upper limit of the condition (5), i.e. 25°, the first and third surfaces 3 and 5 overlap each other at a side closer to the image display device 6 and at a position close to the observer's visual axis 2. Consequently, it is likely that the marginal ray L as shown in FIG. 1 will not reach the observer.

To arrange the optical system such that the internal reflection at the first surface 3 is total reflection, it is important to satisfy the condition (5). If $\theta_{1r}$ is smaller than the lower limit of the condition (5), i.e. −20°, the angle formed between light rays passing through the first and third surfaces 3 and 5 becomes small. Consequently, it becomes impossible to obtain a reflection angle larger than the critical angle, which is the condition for total reflection.

In order to attain total reflection at the first surface 3 and to achieve high resolution, it is important that the angle $\theta_{1r}$ formed between the axial principal ray after passing through the first surface 3 of the ocular optical system 7 and a line normal to the first surface 3 at a point thereon where the axial principal ray passes should satisfy the following condition:

$$-20° \leq \theta_{1r} \leq 7° \tag{6}$$

If $\theta_{1r}$ exceeds the upper limit of the condition (6), i.e. 7°, the angle of reflection at the second surface 4 after the reflection at the first surface 3 becomes large. Consequently, the amount of aberration due to decentration increases. If $\theta_{1r}$ is smaller than the lower limit of the condition (6), i.e. −20°, it becomes impossible to obtain a reflection angle larger than the critical angle, which is the condition for total reflection, as has been described above.

In order to separate a reflecting region of the first surface 3 which internally reflects the light rays passing through the third surface 5 and a transmitting region of the first surface 3 which transmits the light rays reflected by the second surface 4 to project them into the observer's eyeball 1, it is important that the angle $\theta_{1r}$ formed between the axial principal ray after passing through the first surface 3 of the ocular optical system 7 and a line normal to the first surface 3 at a point thereon where the axial principal ray passes should satisfy the following condition:

$$7° \leq \theta_{1r} \leq +25° \tag{7}$$

If $\theta_{1r}$ is smaller than the lower limit of the condition (7), i.e. 7°, the direction of refraction by the first surface 3 becomes closer to the image display device 6. Therefore, the reflecting and transmitting regions overlap each other. Moreover, the size of the ocular optical system 7 becomes exceedingly large.

It is important that the angle $\theta_{1h}$ formed between the axial principal ray after being internally reflected by the first surface 3 of the ocular optical system 7 and a line normal to the first surface 3 at a point thereon where the axial principal ray is internally reflected should satisfy the following condition:

$$35° \leq \theta_{1h} \leq 60° \tag{8}$$

If $\theta_{1h}$ is smaller than the lower limit of the condition (8), i.e. 35°, the angle of reflection at the second surface 4 after the internal reflection at the first surface 3 becomes large. Consequently, the amount of aberration due to the decentration of the second surface 4 increases. If $\theta_{1h}$ exceeds the upper limit of the condition (8), i.e. 60°, the third surface 5 and the lower ray L interfere with each other. Therefore, the marginal rays are cut off, undesirably.

If the optical system is arranged such that the internal reflection at the first surface 3 is total reflection, the angle of reflection at the second surface 4 can be reduced, and it is therefore possible to reduce aberrations due to decentration, particularly comatic aberration. Moreover, it is possible to reduce the thickness (length in the direction Z) of the optical system. In order to attain total reflection at the first surface 3, it is important that the angle $\theta_{1h}$ formed between the axial principal ray after being internally reflected by the first surface 3 of the ocular optical system 7 and a line normal to the first surface 3 at a point thereon where the axial principal ray is internally reflected should satisfy the following condition:

$$40° \leq \theta_{1h} \leq 60° \tag{9}$$

If $\theta_{1h}$ is smaller than the lower limit of the condition (9), i.e. 40°, the incident angle becomes smaller than the critical angle in the case of a transparent medium employed for ordinary optical elements. Therefore, total reflection cannot be obtained.

From the viewpoint of aberration correction, it is important that the angle $\theta_3$ formed between the axial principal ray after passing through the third surface 5 of the ocular optical system 7 and a line normal to the third surface 5 at a point thereon where the axial principal ray passes should satisfy the following condition:

$$-20° \leq \theta_3 \leq 20° \tag{10}$$

In the ocular optical system 7, the first and third surfaces 3 and 5 are refracting surfaces; therefore, it is important in order to project a clear image into an observer's eyeball to minimize chromatic aberrations produced by these two surfaces. However, chromatic aberrations are produced as long as the medium of the optical system is dispersive. The expression (10) is a condition for regulating the amount of chromatic aberration produced by the two surfaces. If $\theta_3$ is smaller than the lower limit of the condition (10), i.e. −20°, the amount of chromatic aberration produced by the third surface 5 increases. If $\theta_3$ exceeds the upper limit of the condition (10), i.e. 20°, the amount of chromatic aberration produced by the third surface 5 also increases to such an extent that the chromatic aberrations cannot be corrected by another portion of the optical system.

It is important from the viewpoint of aberration correction that the angle $\theta_3$ formed between the axial principal ray after passing through the third surface 5 of the ocular optical system 7 and a line normal to the third surface 5 at a point thereon where the axial principal ray passes should satisfy the following condition:

$$-12° \leq \theta_3 \leq 12° \tag{11}$$

The above condition (11) is particularly important when only one medium is used to form an optical element as the ocular optical system 7. If $\theta_3$ is smaller than the lower limit of the condition (11), i.e. −12°, the amount of chromatic aberration produced by the third surface 5 increases. If $\theta_3$ exceeds the upper limit of the condition (11), i.e. 12° the amount of chromatic aberration produced by the third surface 5 also increases, causing the resolution to be degraded.

It is important from the viewpoint of aberration correction that the angle $\theta_3$ formed between the axial principal ray after passing through the third surface 5 of the ocular optical system 7 and a line normal to the third surface 5 at a point thereon where the axial principal ray passes should satisfy the following condition:

$$-5° \leq \theta_3 \leq 5° \qquad (12)$$

The above condition (12) is particularly important when it is intended to form an ocular optical system 7 of wide field angle. If $\theta_3$ is smaller than the lower limit of the condition (12), i.e. $-5°$, the amount of lateral chromatic aberration produced by the third surface 5 increases. If $\theta_3$ exceeds the upper limit of the condition (12), i.e. $5°$, the amount of lateral chromatic aberration produced by the third surface 5 also increases. In particular, in the case of a wide field angle, the resolution at the edges of the image field degrades.

It is also important that the angle $\theta_4$ formed between a line normal to the image display device 6 and the observer's visual axis 2 should satisfy the following condition:

$$-20° \leq \theta_4 \leq 80° \qquad (13)$$

The above expression (13) is a condition for optimizing the size of the ocular optical system 7, including the image display device 6, and the disposition of the ocular optical system 7 when mounted on the observer's face.

If $\theta_4$ is smaller than the lower limit of the condition (13), i.e. $-20°$, the image display device 6 is disposed at a position opposite to the observer at a side remote from the observer, causing an increase in the amount to which the entire optical system projects from the observer's face. In particular, in a case where the image display device 6 has a back light attached thereto as in the case of an LCD (Liquid Crystal Display), the back light also projects forward. Therefore, the overall size of the apparatus becomes large, and the center of gravity lies forward. Accordingly, the apparatus is imbalanced when mounted on the observer's head. If $\theta_4$ exceeds the upper limit of the condition (13), i.e. $80°$, the image display device 6 and the observer's visual axis 2 lie vertically apart from each other. Therefore, the thickness (length in the direction Z) of the optical system increases. Moreover, there is likelihood that the attachment (i.e. a back light or the like in the case of an LCD) of the image display device 6 will interfere with the observer's face.

With a view to minimizing the tilt of principal rays with respect to the image display device 6, it is preferable that the angle $\theta_4$ formed between a line normal to the image display device 6 and the observer's visual axis 2 should satisfy the following condition:

$$20° \leq \theta_4 \leq 60° \qquad (14)$$

The condition (14) is effective when an image display device 6 which is inferior in viewing angle characteristics is used. If $\theta_4$ is smaller than the lower limit of the condition (14), i.e. $20°$, the tilt angle of principal rays to the image display device 6 becomes large. Therefore, when an image display device which is inferior in viewing angle characteristics (colors change according to the angle at which the image display device is viewed), e.g. an LCD, is used, the colors of the observation image undesirably change. Moreover, because a length determined by adding the size of the image display device 6 to the effective diameter of the second surface 4 is needed, the overall length (in the direction Y) of the optical system increases. If $\theta_4$ exceeds the upper limit of the condition (14), i.e. $60°$, the image display device 6 and the observer's visual axis 2 lie vertically apart from each other. Accordingly, the thickness (length in the direction Z) of the optical system increases.

In order to effectively separate a reflecting region of the first surface 3 which internally reflects the light rays passing through the third surface 5 and a transmitting region of the first surface 3 which transmits the light rays reflected by the second surface 4 to project them into the observer's eyeball 1, it is preferable that the angle $\theta_4$ formed between a line normal to the image display device 6 and the observer's visual axis 2 should satisfy the following condition:

$$-20° \leq \theta_4 \leq 20° \qquad (15)$$

If $\theta_4$ is smaller than the lower limit of the condition (15), i.e. $-20°$, the image display device 6 is disposed at a position opposite to the observer at a side remote from the observer, causing an increase in the amount to which the entire optical system projects from the observer's face. If $\theta_4$ exceeds the upper limit of the condition (15), i.e. $20°$, the position at which internal reflection occurs at the first surface 3 is on the observer's visual axis (2) side. Consequently, it becomes impossible to separate the transmitting and reflecting regions of the first surface 3.

From the viewpoint of effectively correcting aberrations, it is preferable that the angle $\theta_4$ formed between a line normal to the image display device 6 and the observer's visual axis 2 should satisfy the following condition:

$$40° \leq \theta_4 \leq 60° \qquad (16)$$

In particular, when it is intended to form an ocular optical system 7 of wide field angle, if the above condition (16) is satisfied, it is possible to minimize the tilt of principal rays with respect to the image display device 6 and hence possible to effectively correct aberrations. If $\theta_4$ is smaller than the lower limit of the condition (16), i.e. $40°$, the tilt angle of marginal principal rays to the image display device 6 becomes large. Therefore, when an image display device which is inferior in viewing angle characteristics (colors change according to the angle at which the image display device is viewed), e.g. an LCD, is used, the colors of the observation image undesirably change. If $\theta_4$ exceeds the upper limit of the condition (16), i.e. $60°$, the image display device 6 and the observer's visual axis 2 lie vertically apart from each other. Accordingly, the thickness (length in the direction Z) of the optical system increases.

From the viewpoint of aberration correction, it is desirable to satisfy the following condition:

$$-10 \leq r_{y1}/r_{y2} \leq 10 \qquad (17)$$

where $r_{y1}$ is the radius of curvature of the first surface 3 of the ocular optical system 7, and $r_{y2}$ is the radius of curvature of the second surface 4.

The ocular optical system 7 according to the present invention is a decentered system, and the refracting power at the second surface 4 is the principal power of the optical system. Accordingly, the second surface 4 produces the largest aberrations due to decentration. Therefore, the power distribution between the first and second surfaces 3 and 4 is preferably within the range defined by the condition (17). If $r_{y1}/r_{y2}$ is smaller than the lower limit of the condition (17), i.e. $-10$, the first surface 3 has positive power. Accordingly, the first surface 3 produces aberration due to decentration which shows a tendency similar to that of comatic aberration due to the decentration of the second surface 4. Therefore, the aberrations cannot satisfactorily be corrected. If $r_{y1}/r_{y2}$ exceeds the upper limit of the condition (17), i.e. $10$, the comatic aberration due to the decentration of the second surface 4 cannot sufficiently be corrected by the first surface 3. Consequently, it becomes impossible to project a clear image.

From the viewpoint of aberration correction, it is more desirable to satisfy the following condition:

$$-7 \leq r_{y1}/r_{y2} \leq 7 \tag{18}$$

where $r_{y1}$ is the radius of curvature of the first surface 3 of the ocular optical system 7, and $r_{y2}$ is the radius of curvature of the second surface 4.

If $r_{y1}/r_{y2}$ is smaller than the lower limit of the condition (18), i.e. −7, the amount of lateral chromatic aberration produced by the refraction at the first surface 3 increases. There is also an increase in the amount of decentration comatic aberration produced by the internal reflection at the first surface 3. If $r_{y1}/r_{y2}$ exceeds the upper limit of the condition (18), i.e. 7, in the case of a wide field angle, decentration comatic aberration produced by the first surface 3 cannot sufficiently be corrected.

When it is intended to obtain an ocular optical system 7 of wide field angle, it is still more desirable to satisfy the following condition:

$$-4 \leq r_{y1}/r_{y2} \leq 4 \tag{19}$$

where $r_{y1}$ is the radius of curvature of the first surface 3 of the ocular optical system 7, and $r_{y2}$ is the radius of curvature of the second surface 4.

If $r_{y1}/r_{y2}$ is smaller than the lower limit of the condition (19), i.e. −4, the positive power of the first surface 3 becomes strong, and the front focal length shortens. Consequently, it becomes impossible to ensure a sufficiently long eye relief. If $r_{y1}/r_{y2}$ exceeds the upper limit of the condition (19), i.e. 4, in the case of a wide field angle, aberrations cannot sufficiently be corrected at the edges of the image field as is the case with the above.

FIG. 2(a) is a front view of an image display apparatus 10 according to the present invention as it is fitted to an observer. FIG. 2(b) is a side view of the image display apparatus 10. As shown in the figures, it is assumed that the horizontal length of each ocular optical system 7 in the image display apparatus 10 is W, and the horizontal length of each ocular optical system 7 from the observer's visual axis 2 to the observer's nose-side end is Wh.

From the viewpoint of effectively mounting the ocular optical systems 7 on the observer's face, it is important that the length W of a horizontal side of each ocular optical system 7 as viewed from the observer's side should satisfy the following condition:

$$20 \text{ millimeters} \leq W \leq 70 \text{ millimeters} \tag{20}$$

The condition (20) is particularly important when the image-fusion region of the left and right ocular optical systems 7 is set to be 100%. If the length W is smaller than the lower limit of the condition (20), i.e. 20 millimeters, it is impossible to ensure the effective area of the first surface 3. If the length W exceeds the upper limit of the condition (20), i.e. 70 millimeters, a problem arises. That is, because the ocular optical systems 7 are provided for the left and right eyes, respectively, if the horizontal length of each ocular optical system 7 has a width longer than the observer's interpupillary distance (i.e. the spacing between the two eyes; about 50 to 70 millimeters in general), the position of the exit pupil of the optical system is outer than the position of the observer's pupil in a case where the center position of the optical system is assumed to be the visual axis of the optical system. Therefore, it becomes impossible to observe a displayed image with both eyes simultaneously (i.e. binocular observation).

From the viewpoint of effectively mounting ocular optical systems 7 of wide field angle on the observer's face, it is important that the length W of a horizontal side of each ocular optical system 7 as viewed from the observer's side should satisfy the following condition:

$$30 \text{ millimeters} \leq W \leq 70 \text{ millimeters} \tag{21}$$

If the length W is smaller than the lower limit of the condition (21), i.e. 30 millimeters, it is impossible to ensure the effective area of the first surface 3 of the ocular optical system 7 having a wide field angle. If the length w exceeds the upper limit of the condition (21), i.e. 70 millimeters, it becomes impossible to perform binocular observation for reasons similar to those set forth above.

From the viewpoint of effectively mounting ocular optical systems 7 having a wider field angle on the observer's face, it is important that the length W of a horizontal side of each ocular optical system 7 as viewed from the observer's side should satisfy the following condition:

$$40 \text{ millimeters} \leq W \leq 70 \text{ millimeters} \tag{22}$$

If the length W is smaller than the lower limit of the condition (22), i.e. 40 millimeters, it is impossible to ensure the effective area of the first surface 3 of the ocular optical system 7 having a wider field angle. If the length W exceeds the upper limit of the condition (22), i.e. 70 millimeters, it becomes impossible to perform binocular observation for reasons similar to those set forth above.

From the viewpoint of effectively mounting ocular optical systems 7 on the observer's head or face, it is important that the horizontal length Wh of each ocular optical system 7 from the observer's visual axis to the nose-side end as viewed from the observer's side should satisfy the following condition:

$$5 \text{ millimeters} \leq Wh \leq 35 \text{ millimeters} \tag{23}$$

If the length Wh is smaller than the lower limit of the condition (23), i.e. 5 millimeters, it is impossible to ensure the effective area of the first surface 3, or the image presented to the observer has only an extremely small area at the inner side of the visual axis 2. If the length Wh exceeds the upper limit of the condition (23), i.e. 35 millimeters, a problem arises. That is, because the ocular optical systems 7 are provided for the left and right eyes, respectively, if the horizontal length of each ocular optical system 7 has a width longer than the observer's interpupillary distance (about 50 to 70 millimeters in general), the position of the exit pupil of the optical system is outer than the position of the observer's pupil. Therefore, it becomes impossible to perform binocular observation.

From the viewpoint of effectively mounting ocular optical systems 7 of wide field angle on the observer's face, it is important that the horizontal length Wh of each ocular optical system 7 from the observer's visual axis to the nose-side end as viewed from the observer's side should satisfy the following condition:

$$7 \text{ millimeters} \leq Wh \leq 35 \text{ millimeters} \tag{24}$$

If the length Wh is smaller than the lower limit of the condition (24), i.e. 7 millimeters, it is impossible to ensure the effective area of the first surface 3 of the ocular optical system 7 having a wide field angle. If the length Wh exceeds the upper limit of the condition (24), i.e. 35 millimeters, it becomes impossible to perform binocular observation for reasons similar to those set forth above.

From the viewpoint of effectively mounting ocular optical systems 7 having a wider field angle on the observer's face, it is important that the horizontal length Wh of each ocular optical system 7 from the observer's visual axis to the nose-side end as viewed from the observer's side should satisfy the following condition:

$$10 \text{ millimeters} \leq Wh \leq 35 \text{ millimeters} \tag{25}$$

If the length Wh is smaller than the lower limit of the condition (25), i.e. 10 millimeters, it is impossible to ensure the effective area of the first surface 3 of the ocular optical system 7 having a wider field angle. If the length Wh exceeds the upper limit of the condition (25), i.e. 35 millimeters, it becomes impossible to perform binocular observation for reasons similar to those set forth above.

Still other objects and advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

DESCRIPTION OF THE PREFERRED EMBODIMENTS

Examples 1 to 11 of the image display apparatus according to the present invention will be described below with reference to FIGS. 3 to 13, which are sectional views of image display apparatuses designed for a single eye according to Examples 1 to 11.

Figure 1:
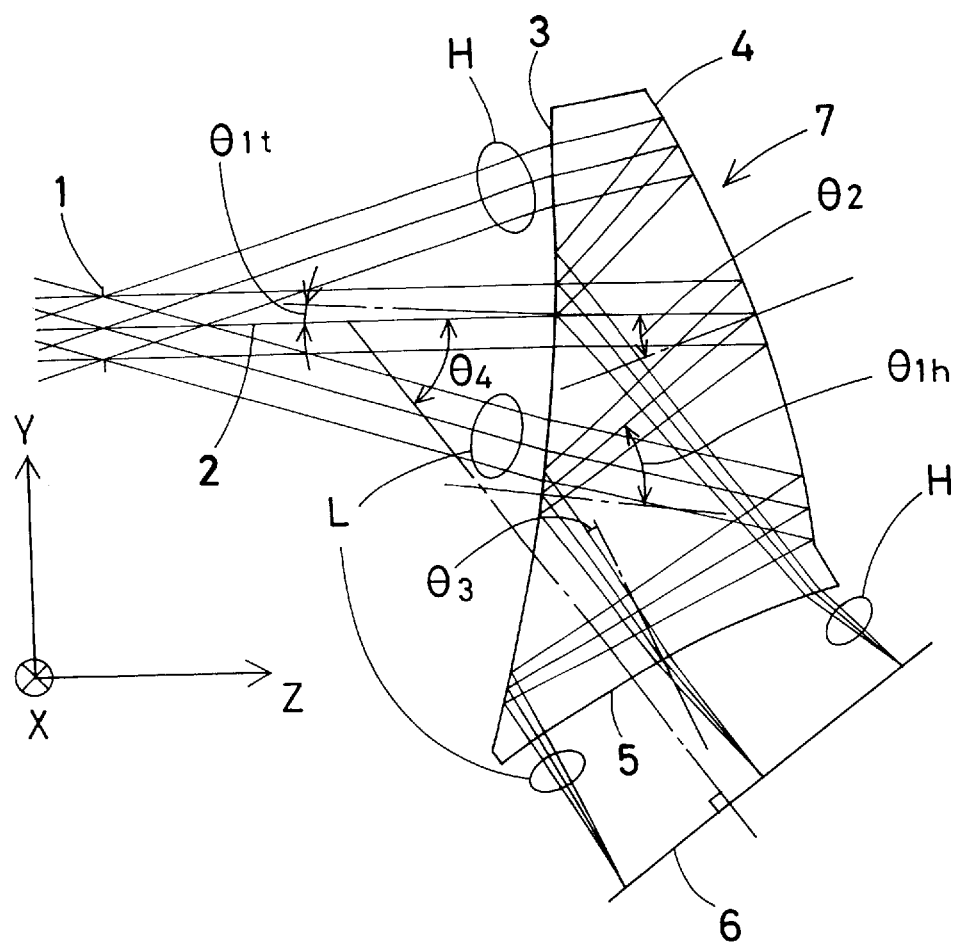
FIG. 1 illustrates an optical ray trace of Example 1 of the image display apparatus according to the present invention to show definitions of various parameters in the present invention.
Figure 2A:
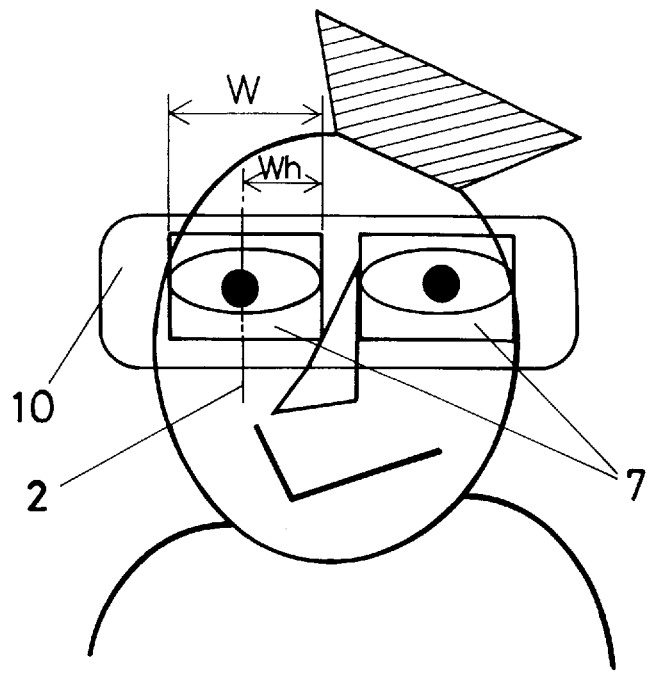
FIGS. 2(*a*) and 2(*b*) are front and sides views, respectively, of the image display apparatus according to the present invention as it is fitted to an observer.
Figure 2B:
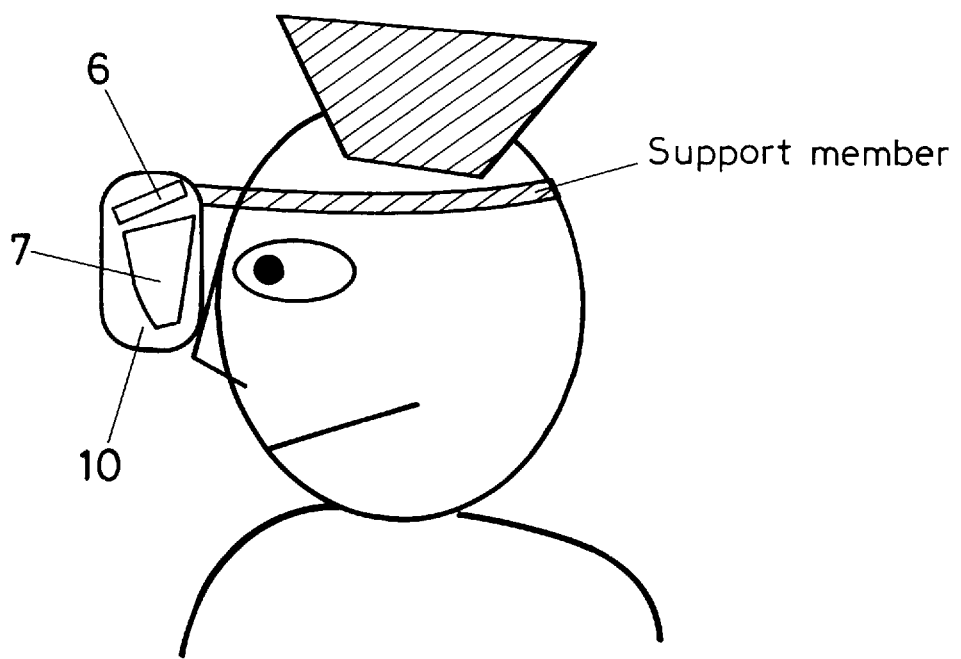
Figure 3:
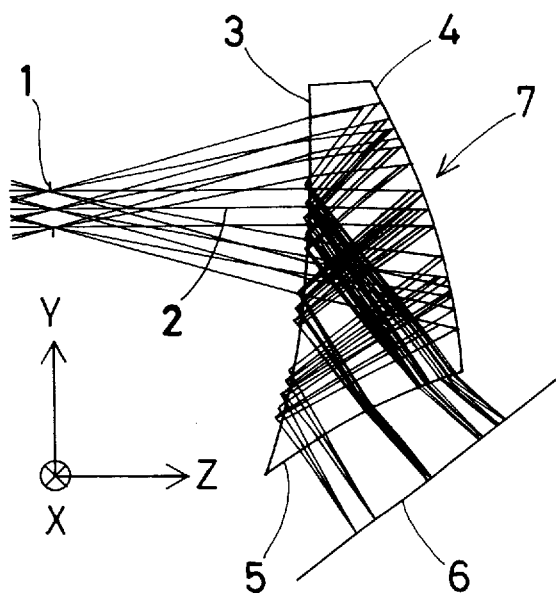
FIG. 3 illustrates an optical ray trace of Example 1 of the image display apparatus according to the present invention.

Constituent parameters of Examples 1 to 11 will be shown later. In the following description, surface Nos. are shown as ordinal numbers in backward tracing from an observer's pupil position 1 toward an image display device 6. A coordinate system is defined as follows: As shown in FIG. 3, with the observer's iris position 1 defined as the origin, the direction of an observer's visual axis 2 is taken as a Z-axis, where the direction toward an ocular optical system 7 from the origin is defined as a positive direction. A vertical direction (as viewed from the observer's eyeball) which perpendicularly intersects the observer's visual axis 2 is taken as a Y-axis, where the upward direction is defined as a position direction. A horizontal direction (as viewed from the observer's eyeball) which perpendicularly intersects the observer's visual axis 2 is taken as an X-axis, where the leftward direction is defined as a positive direction. That is, the plane of the figure is defined as a YZ-plane, and a plane which is perpendicular to the plane of the figure is defined as an XZ-plane. Further, it is assumed that the optical axis is bent in the YZ-plane, which is parallel to the plane of the figure.

In the constituent parameters (shown later), regarding each surface for which eccentricities Y and Z and tilt angle θ are shown, the eccentricity Y is a distance by which the vertex of the surface decenters in the Y-axis direction from the surface No. 1 (pupil position 1), which is a reference surface. The eccentricity Z is a distance by which the vertex of the surface decenters in the Z-axis direction from the surface No. 1. The tilt angle θ is the angle of inclination of the central axis of the surface from the Z-axis. In this case, positive θ means counterclockwise rotation. It should be noted that a surface without indication of eccentricities Y, Z and tilt angle θ is coaxial with respect to the preceding surface.

Regarding surface separations, the surface separation of the surface No. 2 is the distance from the surface No. 1 along the Z-axis direction, and a point on the surface No. 2 that lies on the Z-axis is defined as a reference point. A point which decenters from the reference point in the direction Y by the given eccentricity is the vertex of the surface No. 2. Regarding the coaxial portion, the surface separation is the axial distance from the surface concerned to the next surface. It should be noted that surface separations are shown with the direction of backward tracing along the optical axis defined as a positive direction.

The non-rotationally symmetric aspherical configuration of each surface may be expressed in the coordinate system defining the surface as follows:

$$Z = [(X^2/R_x) + (Y^2/R_y)]/[1 + \{1 - (1 + K_x)(X^2/R_x^2) - (1 + K_y)(Y^2/R_y^2)\}^{1/2}] + AR[(1 - AP)X^2 + (1 + AP)Y^2]^2 + BR[(1 - BP)X^2 + (1 + BP)Y^2]^3$$

where $R_y$ is the paraxial curvature radius of each surface in the YZ-plane (the plane of the figure); $R_x$ is the paraxial curvature radius in the XZ-plane; $K_x$ is the conical coefficient in the XZ-plane; $K_y$ is the conical coefficient in the YZ-plane; AR and BR are 4th- and 6th-order aspherical coefficients, respectively, which are rotationally symmetric with respect to the Z-axis; and AP and BP are 4th- and 6th-order aspherical coefficients, respectively, which are rotationally asymmetric with respect to the Z-axis.

The rotationally symmetric aspherical configuration of each surface may be expressed by.

$$Z=[(h^2/R)/[1+=1-(1+K)(h^2/R^2)]^{1/2}]+Ah^4+Bh^6$$

where R is the paraxial curvature radius; K is the conical coefficient; A and B are 4th- and 6th-order aspherical coefficients, respectively; and h is given by $h^2=X^2+Y^2$.

It should be noted that the refractive index of a medium between surfaces is expressed by the refractive index for the spectral d-line. Lengths are given in millimeters.

The following examples are all image display apparatuses for the right eye. An image display apparatus for the left eye can be realized by disposing the constituent optical elements of each example in symmetrical relation to the apparatus for the right eye with respect to the YZ-plane.

In an actual apparatus, needless to say, the direction in which the optical axis is bent by the ocular optical system may be any of the upward, downward and sideward directions of the observer.

In each sectional view, reference numeral 1 denotes an observer's pupil position, 2 an observer's visual axis, 3 a first surface of an ocular optical system, 4 a second surface of the ocular optical system, 5 a third surface of the ocular optical system, and 6 an image display device. Reference numeral 7 denotes the ocular optical system having the first, second and third surfaces 3, 4 and 5. Reference numeral 9 denotes optical surfaces.

The actual path of light rays in each example is as follows: In Example 1, for instance, a bundle of light rays emitted from the image display device 6 enters the ocular optical system 7 while being refracted by the third surface 5 of the ocular optical system 7. The incident ray bundle is internally reflected by the first surface 3 and reflected by the second surface 4. Then, the ray bundle is incident on the first surface 3 and refracted thereby so as to be projected into the observer's eyeball with the observer's iris position or eyeball rolling center as the exit pupil 1.

EXAMPLE 1

In this example, as shown in the sectional view of FIG. 3, the horizontal field angle is 40°, while the vertical field angle is 30.6°, and the pupil diameter is 4 millimeters. In the constituent parameters (shown later), the surface Nos. 2, 3 and 4 are anamorphic aspherical surfaces, and the surface No. 5 is a spherical surface.

EXAMPLE 2

Figure 4:
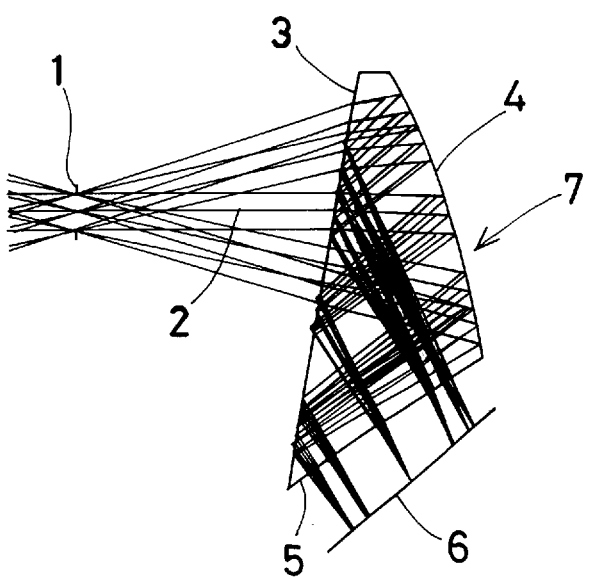
FIG. 4 illustrates an optical ray trace of Example 2 of the image display apparatus according to the present invention.

In this example, as shown in the sectional view of FIG. 4, the horizontal field angle is 45°, while the vertical field angle is 34.5°, and the pupil diameter is 4 millimeters. In the constituent parameters (shown later), the surface Nos. 2, 3 and 4 are anamorphic aspherical surfaces, and the surface No. 5 is a plane surface.

EXAMPLE 3

Figure 5:
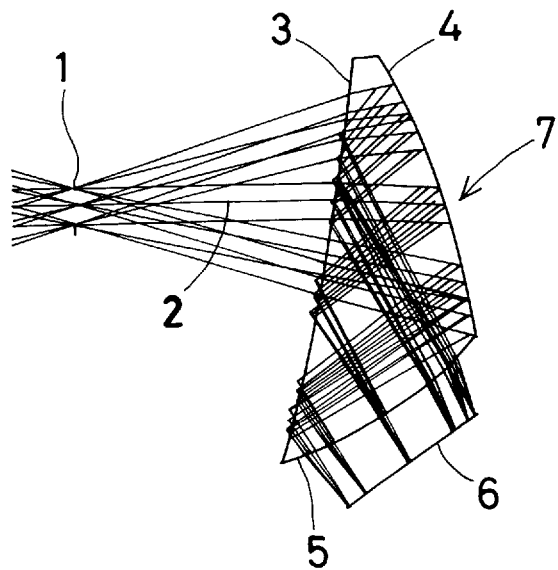
FIG. 5 illustrates an optical ray trace of Example 3 of the image display apparatus according to the present invention.

In this example, as shown in the sectional view of FIG. 5, the horizontal field angle is 45°, while the vertical field angle is 34.5°, and the pupil diameter is 4 millimeters. In the constituent parameters (shown later), the surface Nos. 2, 3, 4 and 5 are anamorphic aspherical surfaces.

EXAMPLE 4

Figure 6:
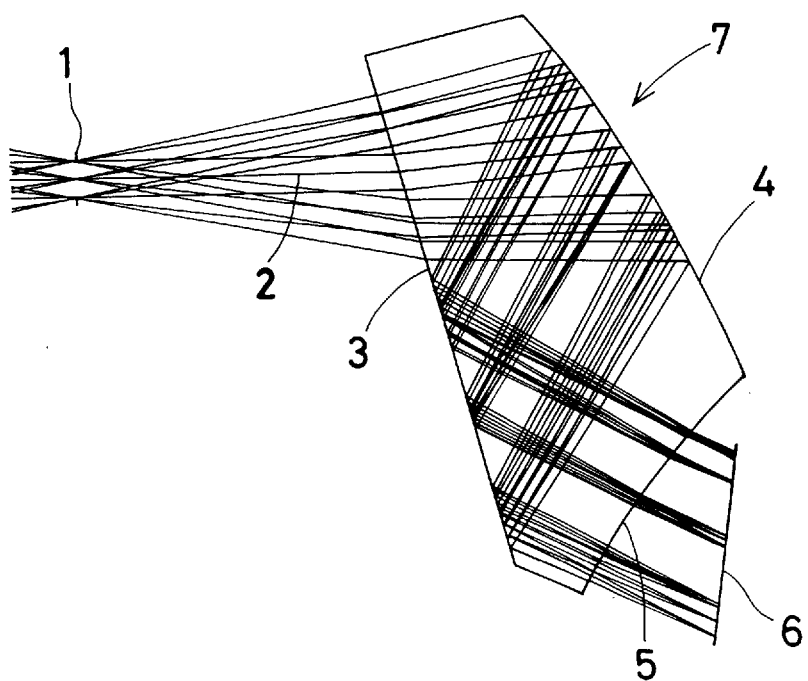
FIG. 6 illustrates an optical ray trace of Example 4 of the image display apparatus according to the present invention.

In this example, as shown in the sectional view of FIG. 6, the horizontal field angle is 30°, while the vertical field angle is 22.7°, and the pupil diameter is 4 millimeters. In the constituent parameters (shown later), the surface No. 3 is an anamorphic aspherical surface. Surface Nos. 2 and 4 are plane surfaces, and the surface No. 5 is a spherical surface.

EXAMPLE 5

Figure 7:
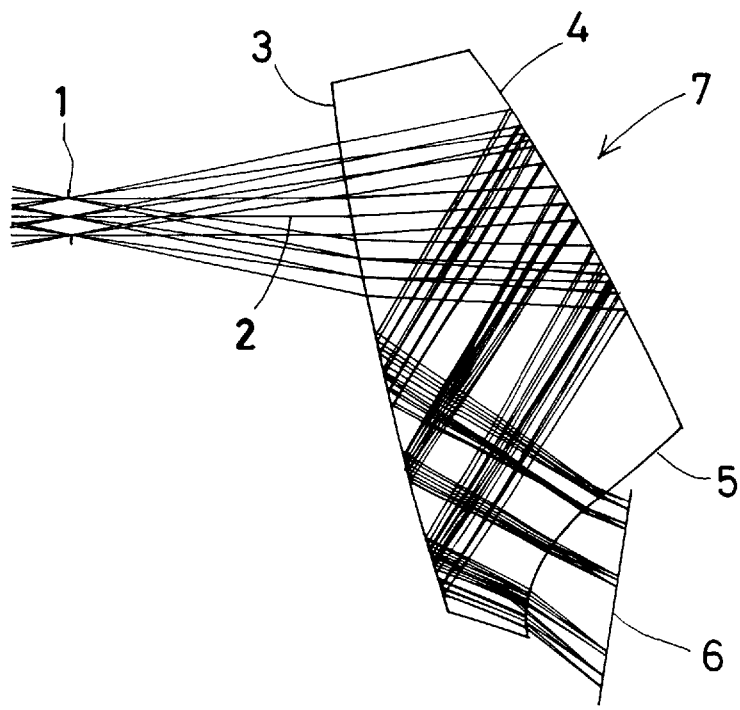
FIG. 7 illustrates an optical ray trace of Example 5 of the image display apparatus according to the present invention.

In this example, as shown in the sectional view of FIG. 7, the horizontal field angle is 30°, while the vertical field angle is 22.7°, and the pupil diameter is 4 millimeters. In the constituent parameters (shown later), the surface Nos. 3 and 5 are anamorphic aspherical surfaces, and the surfaces Nos. 2 and 4 are spherical surfaces.

EXAMPLE 6

Figure 8:
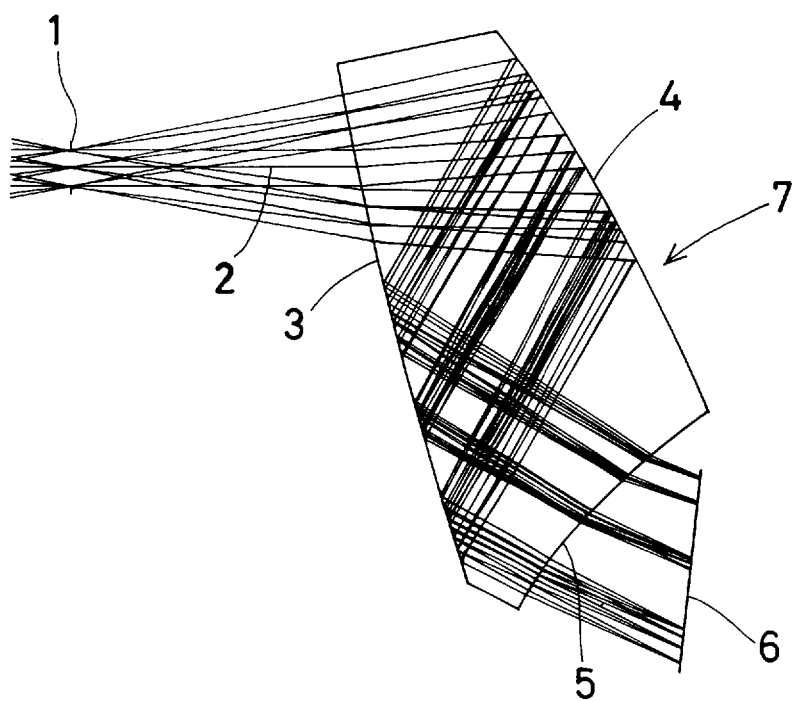
FIG. 8 illustrates an optical ray trace of Example 6 of the image display apparatus according to the present invention.

In this example, as shown in the sectional view of FIG. 8, the horizontal field angle is 30°, while the vertical field angle is 22.7°, and the pupil diameter is 4 millimeters. In the constituent parameters (shown later), the surface No. 3 is an anamorphic aspherical surface, and the surfaces Nos. 2, 4 and 5 are spherical surfaces.

EXAMPLE 7

Figure 9:
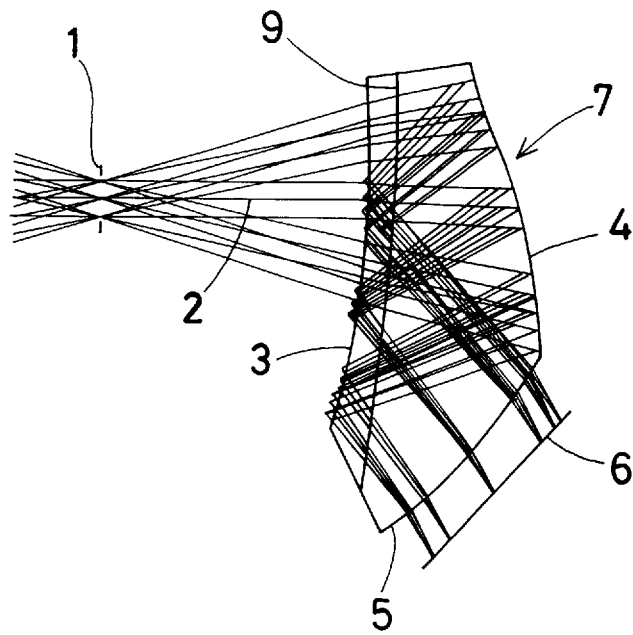
FIG. 9 illustrates an optical ray trace of Example 7 of the image display apparatus according to the present invention.

In this example, as shown in the sectional view of FIG. 9, the horizontal field angle is 45°, while the vertical field angle is 34.5°, and the pupil diameter is 4 millimeters. In the constituent parameters (shown later), the surface Nos. 2, 3, 5, 6 and 7 are spherical surfaces. Surface No. 4 is an anamorphic aspherical surface, and the surface No. 8 is a rotationally symmetric aspherical surface. Optical surfaces 9 are defined by the surface Nos. 3, 5 and 7, which are disposed in the ocular optical system (decentered optical element) 7 in such a manner as to be decentered with respect to the visual axis. The surface No. 3 is disposed between the surface Nos. 2 and 4. The surface No. 5 is disposed between the surface Nos. 4 and 6. The surface No. 7 is disposed between the surface Nos. 6 and 8.

EXAMPLE 8

Figure 10:
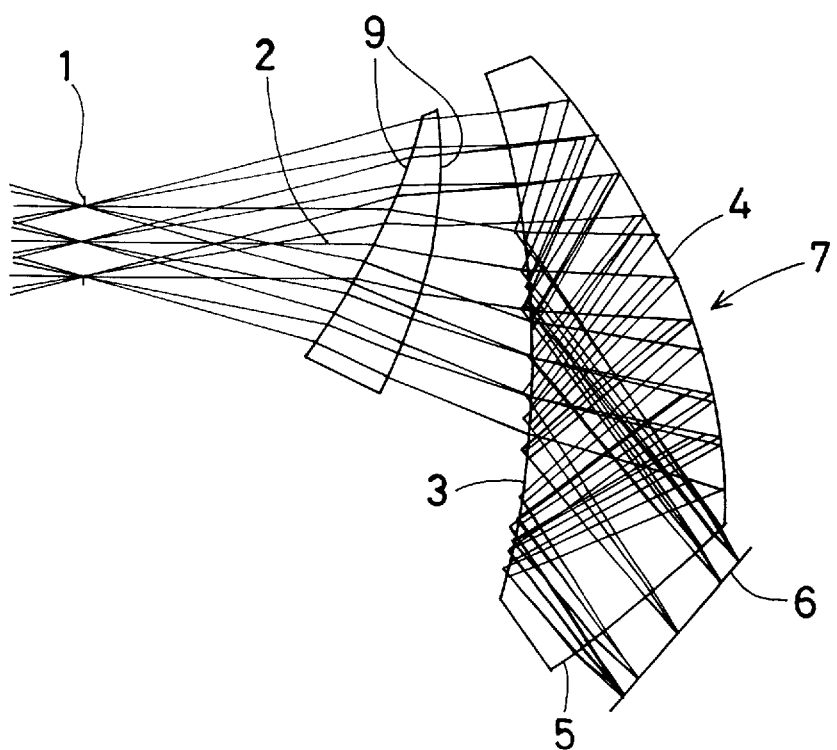
FIG. 10 illustrates an optical ray trace of Example 8 of the image display apparatus according to the present invention.

In this example, as shown in the sectional view of FIG. 10, the horizontal field angle is 40°, while the vertical field angle is 30.5°, and the pupil diameter is 8 millimeters. In the constituent parameters (shown later), the surface Nos. 2, 3, 4, 6 and 7 are spherical surfaces, and the surface No. 5 is an anamorphic aspherical surface. Optical surfaces 9 are formed by a positive lens which is defined by the surface Nos. 2 and 3. The positive lens is disposed between the ocular optical system (decentered optical element) 7 and the observer's eyeball in such a manner as to be decentered with respect to the visual axis.

EXAMPLE 9

Figure 11:
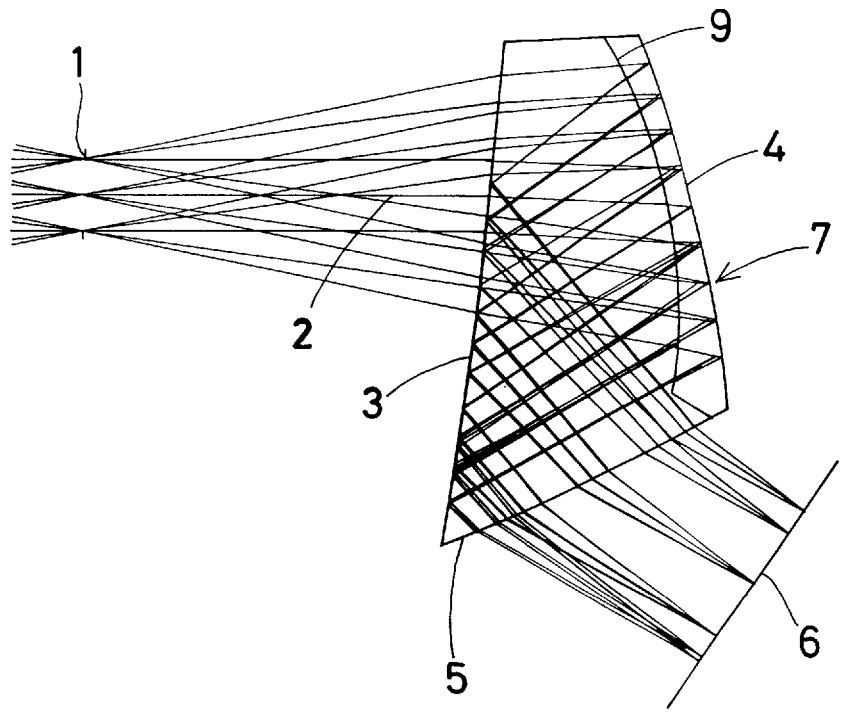
FIG. 11 illustrates an optical ray trace of Example 9 of the image display apparatus according to the present invention.

In this example, as shown in the sectional view of FIG. 11, the horizontal field angle is 30°, while the vertical field angle is 22.7°, and the pupil diameter is 8 millimeters. In the constituent parameters (shown later), the surface Nos. 3, 5 and 7 are spherical surfaces, and surface Nos. 2, 4 and 6 are anamorphic aspherical surfaces. Optical surfaces 9 are defined by the surface Nos. 3 and 5, which are disposed in the ocular optical system (decentered optical element) 7 in such a manner as to be decentered with respect to the visual axis. The surface No. 3 is disposed between the surface Nos. 2 and 4. The surface No. 5 is disposed between the surface Nos. 4 and 6.

EXAMPLE 10

Figure 12:
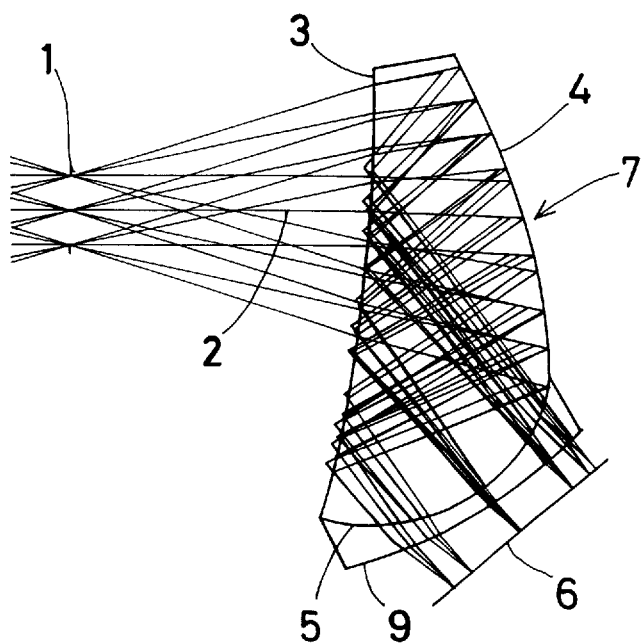
FIG. 12 illustrates an optical ray trace of Example 10 of the image display apparatus according to the present invention.

In this example, as shown in the sectional view of FIG. 12, the horizontal field angle is 45°, while the vertical field angle is 34.5°, and the pupil diameter is 8 millimeters. In the constituent parameters (shown later), the surface Nos. 5 and 6 are spherical surfaces, and the surface Nos. 2, 3 and 4 are anamorphic aspherical surfaces. An optical surface 9 is defined by the surface No. 6. The surface No. 6 is bonded to the ocular optical system (decentered optical element) 7 in such a manner as to be decentered with respect to the visual axis to form a negative lens in combination with the surface No. 5 of the decentered optical element 7.

EXAMPLE 11

Figure 13:
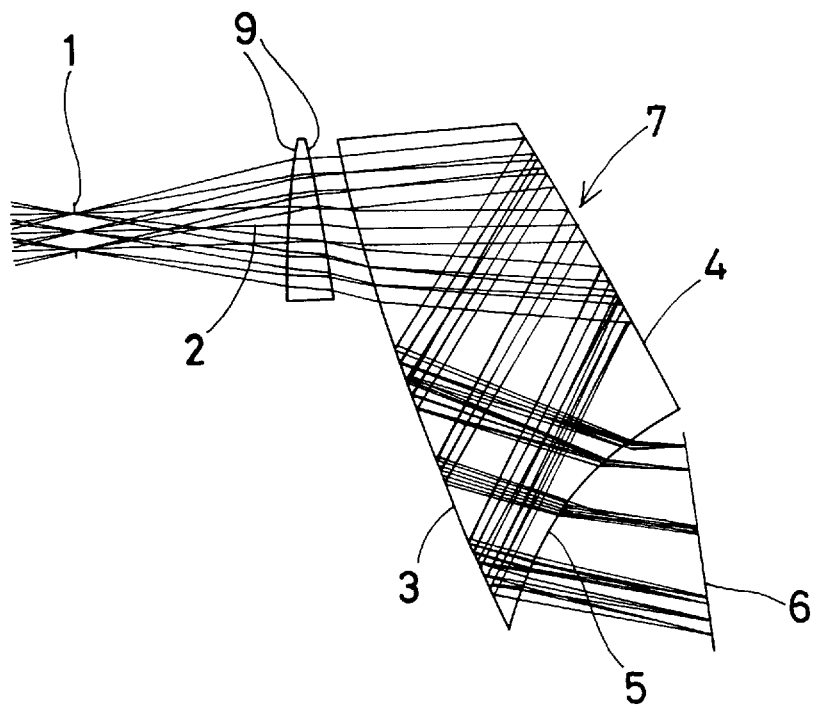
FIG. 13 illustrates an optical ray trace of Example 11 of the image display apparatus according to the present invention.
Figure 14A:
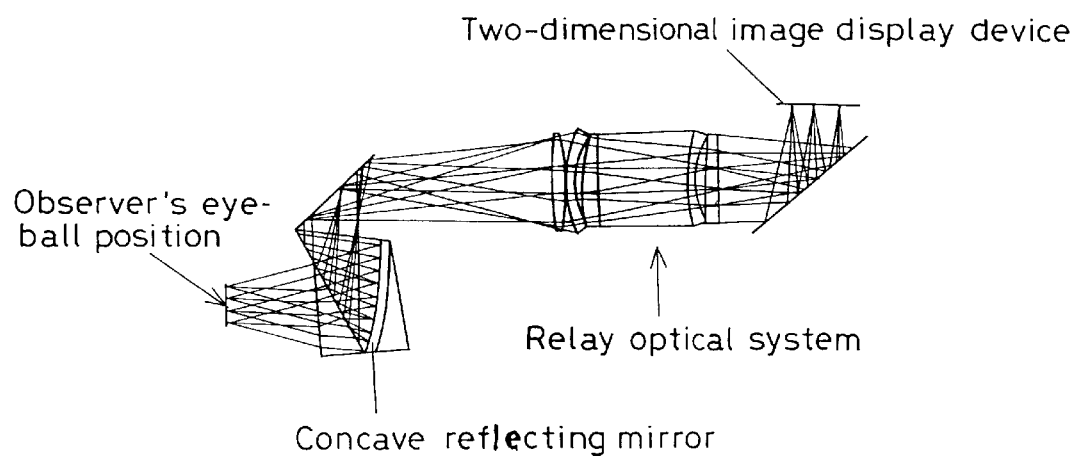
FIG. 14(*a*) and 14(*b*) show an optical system of a conventional image display apparatus.
Figure 14B:
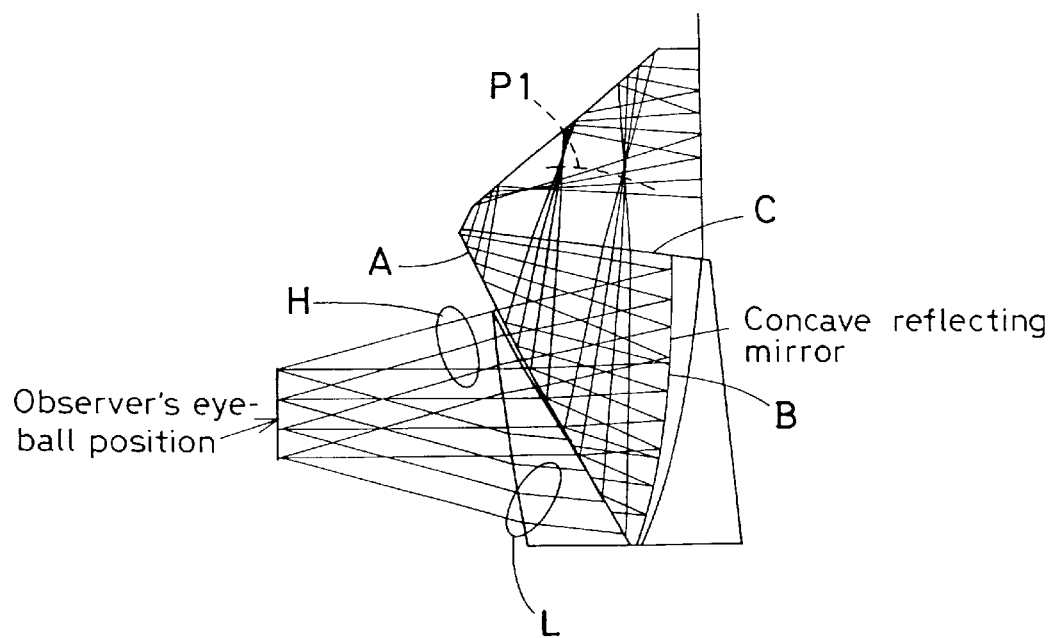

In this example, as shown in the sectional view of FIG. 13, the horizontal field angle is 30°, while the vertical field angle is 22.7°, and the pupil diameter is 4 millimeters. In the constituent parameters (shown later), the surface Nos. 2, 3, 4, 6 and 7 are spherical surfaces, and surface No. 5 is an anamorphic aspherical surface. Optical surfaces 9 are formed by a positive lens which is defined by the surface Nos. 2 and 3. The positive lens is disposed between the ocular optical system (decentered optical element) 7 and the observer's eyeball in such a manner as to be decentered with respect to the visual axis.

Constituent parameters of the above-described Examples 1 to 11 are as follows:

| Surface No. | | Radius of curvature | Surface separation | Refractive index (Eccentricity) | | Abbe's No. (Tilt angle) | |
|---|---|---|---|---|---|---|---|
| | | Example 1 | | | | | |
| 1 | | ∞ (pupil) | 26.360 | | | | |
| 2 | $R_y$ | −108.187 | | 1.4922 | | 57.50 | |
| | $R_x$ | −73.105 | | Y −24.028 | θ | −14.70° | |
| | $K_y$ | 0 | | | | | |
| | $K_x$ | 0 | | | | | |
| | AR | 5.54186 × 10$^{-7}$ | | | | | |
| | BR | 8.17563 × 10$^{-11}$ | | | | | |
| | AP | −0.0804376 | | | | | |
| | BP | −1.37947 | | | | | |
| 3 | $R_y$ | −69.871 | | 1.4922 | | 57.50 | |
| | $R_x$ | −60.374 | | Y 19.109 | θ | 36.66° | |
| | $K_y$ | −0.136826 | | Z 33.339 | | | |
| | $K_x$ | −0.123306 | | | | | |
| | AR | −7.23291 × 10$^{-11}$ | | | | | |
| | BR | −4.52937 × 10$^{-12}$ | | | | | |
| | AP | 29.0752 | | | | | |
| | BP | −2.08536 | | | | | |
| 4 | $R_y$ | −108.187 | | 1.4922 | | 57.50 | |
| | $R_x$ | −73.105 | | Y −24.028 | θ | −14.70° | |
| | $K_y$ | 0 | | Z 26.360 | | | |
| | $K_x$ | 0 | | | | | |
| | AR | 5.54186 × 10$^{-7}$ | | | | | |
| | BR | 8.17563 × 10$^{-11}$ | | | | | |
| | AP | −0.0804376 | | | | | |
| | BP | −1.37947 | | | | | |
| 5 | | 77.772 | | Y −35.215 | θ | −47.77° | |
| | | | | Z 18.817 | | | |
| 6 | | (display device) | | (from surface No. 1) | | | |
| | | | | Y −30.892 | θ | −52.77° | |
| | | | | Z 43.084 | | | |
| $θ_2$ | = | 19.7° | | | | | |
| $θ_{1t}$ | = | −3.2° | | | | | |
| $θ_{1h}$ | = | 46.7° | | | | | |
| $θ_3$ | = | 8.7° | | | | | |
| $θ_4$ | = | 52.8° | | | | | |
| $r_{y1}/r_{y2}$ | = | 1.55 | | | | | |
| | | Example 2 | | | | | |
| 1 | | ∞ (pupil) | 20.267 | | | | |
| 2 | $R_y$ | −420.378 | | 1.4922 | | 57.50 | |
| | $R_x$ | −99.789 | | Y −49.262 | θ | −13.94° | |
| | $K_y$ | 5.709616 | | | | | |
| | $K_x$ | −2.785007 | | | | | |
| | AR | 5.37533 × 10$^{-7}$ | | | | | |
| | BR | −6.41106 × 10$^{-11}$ | | | | | |
| | AP | −0.422753 | | | | | |
| | BP | −0.455912 | | | | | |
| 3 | $R_y$ | −122.291 | | 1.4922 | | 57.50 | |
| | $R_x$ | −69.335 | | Y −34.556 | θ | 37.99° | |
| | $K_y$ | 0.774787 | | Z 24.367 | | | |
| | $K_x$ | −0.104426 | | | | | |
| | AR | −1.82945 × 10$^{-9}$ | | | | | |
| | BR | 4.45272 × 10$^{-14}$ | | | | | |
| | AP | 5.40431 | | | | | |
| | BP | −1.13468 | | | | | |
| 4 | $R_y$ | −420.378 | | 1.4922 | | 57.50 | |
| | $R_x$ | −99.789 | | Y −49.262 | θ | −13.94° | |
| | $K_y$ | 5.709616 | | Z 20.267 | | | |
| | $K_x$ | −2.785007 | | | | | |
| | AR | 5.37533 × 10$^{-7}$ | | | | | |
| | BR | −6.41106 × 10$^{-11}$ | | | | | |
| | AP | −0.422753 | | | | | |
| | BP | −0.455912 | | | | | |
| 5 | | ∞ | | Y −33.816 | θ | −56.84° | |
| | | | | Z 21.726 | | | |
| 6 | | (display device) | | Y −31.165 | θ | −50.91° | |
| | | | | Z 38.433 | | | |
| $θ_2$ | = | 21.0° | | | | | |
| $θ_{1t}$ | = | −10.8° | | | | | |
| $θ_{1h}$ | = | 48.9° | | | | | |
| $θ_3$ | = | −2.7° | | | | | |
| $θ_4$ | = | 50.9° | | | | | |
| $r_{y1}/r_{y2}$ | = | 3.44 | | | | | |
| | | Example 3 | | | | | |
| 1 | | ∞ (pupil) | 19.657 | | | | |
| 2 | $R_y$ | −178.469 | | 1.4922 | | 57.50 | |
| | $R_x$ | −75.710 | | Y −42.983 | θ | −19.56° | |
| | $K_y$ | −4.700072 | | | | | |
| | $K_x$ | −1.222689 | | | | | |
| | AR | 9.71232 × 10$^{-7}$ | | | | | |
| | BR | −1.79187 × 10$^{-10}$ | | | | | |
| | AP | −0.426826 | | | | | |
| | BP | −0.380615 | | | | | |
| 3 | $R_y$ | −81.632 | | 1.4922 | | 57.50 | |
| | $R_x$ | −66.826 | | Y 30.011 | θ | 40.46° | |
| | $K_y$ | −0.070545 | | Z 26.362 | | | |
| | $K_x$ | −0.574123 | | | | | |
| | AR | 3.90381 × 10$^{-11}$ | | | | | |
| | BR | −2.95604 × 10$^{-14}$ | | | | | |
| | AP | −62.1044 | | | | | |
| | BP | 3.68602 | | | | | |
| 4 | $R_y$ | −178.469 | | 1.4922 | | 57.50 | |
| | $R_x$ | −75.710 | | Y −42.983 | θ | −19.56° | |
| | $K_y$ | −4.700072 | | Z 19.657 | | | |
| | $K_x$ | −1.222689 | | | | | |
| | AR | 9.71232 × 10$^{-7}$ | | | | | |
| | BR | −1.79187 × 10$^{-10}$ | | | | | |
| | AP | −0.426826 | | | | | |
| | BP | −0.380615 | | | | | |
| 5 | $R_y$ | −78.809 | | Y −28.629 | θ | −69.21° | |
| | $R_x$ | −15.380 | | Z 27.051 | | | |
| | $K_y$ | −12.000 | | | | | |
| | $K_x$ | −7.201382 | | | | | |
| | AR | −9.38885 × 10$^{-7}$ | | | | | |
| | BR | −3.46619 × 10$^{-9}$ | | | | | |
| | AP | −0.995315 | | | | | |
| | BP | 0.706461 | | | | | |
| 6 | | (display device) | | Y −30.077 | θ | −55.73° | |
| | | | | Z 38.578 | | | |
| $θ_2$ | = | 20.1° | | | | | |
| $θ_{1t}$ | = | −10.7° | | | | | |
| $θ_{1h}$ | = | 48.4° | | | | | |
| $θ_3$ | = | 2.4° | | | | | |
| $θ_4$ | = | 55.7° | | | | | |
| $r_{y1}/r_{y2}$ | = | 2.19 | | | | | |
| | | Example 4 | | | | | |
| 1 | | ∞ (pupil) | 35.674 | | | | |

| Surface No. | Radius of curvature | | Surface separation | Refractive index (Eccentricity) | | Abbe's No. (Tilt angle) |
|---|---|---|---|---|---|---|
| 2 | ∞ | | | 1.4870 | | 70.40 |
| | | | Y | 4.942 | θ | 15.45° |
| 3 | $R_y$ | −166.785 | | 1.4870 | | 70.40 |
| | $R_x$ | −129.798 | Y | −2.361 | θ | 30.67° |
| | $K_y$ | 0.644353 | Z | 64.642 | | |
| | $K_x$ | −3.574565 | | | | |
| | AR | $-1.34076 \times 10^{-7}$ | | | | |
| | BR | $-6.16761 \times 10^{-13}$ | | | | |
| | AP | −0.140999 | | | | |
| | BP | −6.05079 | | | | |
| 4 | ∞ | | | 1.4870 | | 70.40 |
| | | | Y | 4.942 | θ | 15.45° |
| | | | Z | 35.674 | | |
| 5 | 92.827 | | Y | −21.834 | θ | −50.80° |
| | | | Z | 78.827 | | |
| 6 | (display device) | | Y | −44.030 | θ | −8.14° |
| | | | Z | 74.025 | | |
| $\theta_2$ | = | 27.4° | | | | |
| $\theta_{1t}$ | = | 15.4° | | | | |
| $\theta_{1h}$ | = | 44.5° | | | | |
| $\theta_3$ | = | 7.1° | | | | |
| $\theta_4$ | = | 8.1° | | | | |
| $r_{y1}/r_{y2}$ | = | 0 | | | | |

Example 4

| Surface No. | Radius of curvature | | Surface separation | Refractive index (Eccentricity) | | Abbe's No. (Tilt angle) |
|---|---|---|---|---|---|---|
| 1 | ∞ (pupil) | | 32.614 | | | |
| 2 | 359.756 | | | 1.4870 | | 70.40 |
| | | | Y | 2.346 | θ | 9.84° |
| 3 | $R_y$ | −173.440 | | 1.4870 | | 70.40 |
| | $R_x$ | −140.501 | Y | −1.857 | θ | 29.87° |
| | $K_y$ | −8.751468 | Z | 58.946 | | |
| | $K_x$ | 4.994003 | | | | |
| | AR | $2.50178 \times 10^{-8}$ | | | | |
| | BR | $-1.79281 \times 10^{-14}$ | | | | |
| | AP | −3.8616 | | | | |
| | BP | 23.172 | | | | |
| 4 | 359.756 | | | 1.4870 | | 70.40 |
| | | | Y | 2.346 | θ | 9.84° |
| | | | Z | 32.614 | | |
| 5 | $R_y$ | −71.035 | Y | −28.993 | θ | −50.31° |
| | $R_x$ | −30.258 | Z | 64.366 | | |
| | $K_y$ | 0 | | | | |
| | $K_x$ | −4.016232 | | | | |
| | AR | $1.64494 \times 10^{-5}$ | | | | |
| | BR | $-6.89738 \times 10^{-9}$ | | | | |
| | AP | 0.757293 | | | | |
| | BP | −0.0405894 | | | | |
| 6 | (display device) | | Y | −42.040 | θ | −9.06° |
| | | | Z | 63.493 | | |
| $\theta_2$ | = | 27.8° | | | | |
| $\theta_{1t}$ | = | 10.2° | | | | |
| $\theta_{1h}$ | = | 43.9° | | | | |
| $\theta_3$ | = | 4.9° | | | | |
| $\theta_4$ | = | 9.1° | | | | |
| $r_{y1}/r_{y2}$ | = | −2.07 | | | | |

Example 6

| Surface No. | Radius of curvature | | Surface separation | Refractive index (Eccentricity) | | Abbe's No. (Tilt angle) |
|---|---|---|---|---|---|---|
| 1 | ∞ (pupil) | | 31.861 | | | |
| 2 | 624.447 | | | 1.4870 | | 70.40° |
| | | | Y | 4.081 | θ | 12.08° |
| 3 | $R_y$ | −205.155 | | 1.4870 | | 70.40 |
| | $R_x$ | −147.117 | Y | −0.579 | θ | 31.42° |
| | $K_y$ | 5.070131 | Z | 59.565 | | |
| | $K_x$ | −2.741334 | | | | |
| | AR | $-9.17885 \times 10^{-9}$ | | | | |
| | BR | $-4.90794 \times 10^{-13}$ | | | | |
| | AP | 0.353607 | | | | |
| | BP | −8.4008 | | | | |
| 4 | 624.447 | | | 1.4870 | | 70.40 |
| | | | Y | 4.081 | θ | 12.08° |
| | | | Z | 31.861 | | |
| 5 | 62.779 | | Y | −30.891 | θ | −54.73° |
| | | | Z | 69.696 | | |
| 6 | (display device) | | Y | −46.009 | θ | −6.40° |
| | | | Z | 71.400 | | |
| $\theta_2$ | = | 28.1° | | | | |
| $\theta_{1t}$ | = | 12.5° | | | | |
| $\theta_{1h}$ | = | 45.0° | | | | |
| $\theta_3$ | = | 11.8° | | | | |
| $\theta_4$ | = | 6.4° | | | | |
| $r_{y1}/r_{y2}$ | = | −3.04 | | | | |

Example 7

| Surface No. | Radius of curvature | | Surface separation | Refractive index (Eccentricity) | | Abbe's No. (Tilt angle) |
|---|---|---|---|---|---|---|
| 1 | ∞ (pupil) | | 25.798 | | | |
| 2 | −96.979 | | | 1.7550 | | 27.60 |
| | | | Y | 35.503 | θ | 19.41° |
| 3 | −371.916 | | | 1.7184 | | 46.86 |
| | | | Y | 28.466 | θ | 1.64° |
| | | | Z | 34.179 | | |
| 4 | $R_y$ | −73.443 | | 1.7184 | | 46.86 |
| | $R_x$ | −69.804 | Y | −27.105 | θ | −5.80° |
| | $K_y$ | 0.36532 | Z | 50.843 | | |
| | $K_x$ | −0.017813 | | | | |
| | AR | $2.37314 \times 10^{-10}$ | | | | |
| | BR | $3.61091 \times 10^{-12}$ | | | | |
| | AP | −8.04115 | | | | |
| | BP | 0.142633 | | | | |
| 5 | −371.916 | | | 1.7550 | | 27.60 |
| | | | Y | 28.466 | θ | 1.64° |
| | | | Z | 34.179 | | |
| 6 | −96.979 | | | 1.7550 | | 27.60 |
| | | | Y | 35.503 | θ | 19.41° |
| | | | Z | 25.789 | | |
| 7 | −371.916 | | | 1.7184 | | 46.86 |
| | | | Y | 28.466 | θ | 1.64° |
| | | | Z | 34.171 | | |
| 8 | R | −64.000 | Y | −5.065 | θ | −14.73° |
| | K | 0.032998 | Z | 55.928 | | |
| | A | $-2.03599 \times 10^{-6}$ | | | | |
| | B | $8.44986 \times 10^{-10}$ | | | | |
| 9 | (device display) | | Y | −32.487 | θ | −42.92° |
| | | | Z | 46.354 | | |
| $\theta_2$ | = | 16.6° | | | | |
| $\theta_{1t}$ | = | −1.9° | | | | |
| $\theta_{1h}$ | = | 40.5° | | | | |
| $\theta_3$ | = | −8.6° | | | | |
| $\theta_4$ | = | 42.9° | | | | |
| $r_{y1}/r_{y2}$ | = | 1.15 | | | | |

Example 8

| Surface No. | Radius of curvature | | Surface separation | Refractive index (Eccentricity) | | Abbe's No. (Tilt angle) |
|---|---|---|---|---|---|---|
| 1 | ∞ (pupil) | | 5.434 | | | |
| 2 | −67.198 | | 12.671 | 1.4870 | | 70.40 |
| | | | Y | −28.840 | θ | −62.14° |
| 3 | −55.775 | | | | | |
| 4 | −108.280 | | | 1.7095 | | 47.70 |
| | | | Y | 23.401 | θ | 20.84° |
| | | | Z | 45.112 | | |
| 5 | $R_y$ | −81.008 | | 1.7095 | | 47.70 |
| | $R_x$ | −76.504 | Y | −20.800 | θ | 9.41° |
| | $K_y$ | 0.596647 | Z | 73.513 | | |
| | $K_x$ | 0.2904 | | | | |
| | AR | $6.598 \times 10^{-8}$ | | | | |
| | BR | $7.20621 \times 10^{-12}$ | | | | |
| | AP | −0.0350833 | | | | |
| | BP | −0.148558 | | | | |
| 6 | −108.280 | | | 1.7095 | | 47.70 |
| | | | Y | 23.401 | θ | 20.84° |
| | | | Z | 45.112 | | |
| 7 | −168.220 | | | | | |
| | | | Y | −4.594 | θ | −33.61° |
| | | | Z | 96.768 | | |
| 8 | (display device) | | Y | −44.345 | θ | −40.19° |
| | | | Z | 69.067 | | |
| $\theta_2$ | = | 24.6° | | | | |
| $\theta_{1t}$ | = | 15.1° | | | | |
| $\theta_{1h}$ | = | 50.1° | | | | |
| $\theta_3$ | = | −3.7° | | | | |
| $\theta_4$ | = | 40.2° | | | | |
| $r_{y1}/r_{y2}$ | = | 1.34 | | | | |

Example 9

| Surface No. | Radius of curvature | | Surface separation | Refractive index (Eccentricity) | | Abbe's No. (Tilt angle) |
|---|---|---|---|---|---|---|
| 1 | ∞ (pupil) | | 44.607 | | | |
| 2 | $R_y$ | −735.371 | | 1.6792 | | 51.00 |

-continued

| Surface No. | | Radius of curvature | Surface sepa-ration | | Refractive index (Eccentricity) | | Abbe's No. (Tilt angle) |
|---|---|---|---|---|---|---|---|
| | $R_x$ | ∞ | | Y | −18.782 | θ | −7.75° |
| | $K_y$ | 0 | | | | | |
| | $K_x$ | 0 | | | | | |
| | AR | $-1.57554 \times 10^{-8}$ | | | | | |
| | BR | $9.32392 \times 10^{-14}$ | | | | | |
| | AP | −1.67996 | | | | | |
| | BP | 0.122856 | | | | | |
| 3 | | −61.610 | | | 1.6682 | | 32.23 |
| | | | | Y | 18.019 | θ | 29.91° |
| | | | | Z | 60.673 | | |
| 4 | $R_y$ | −151.581 | | | 1.6682 | | 32.23 |
| | $R_x$ | −170.090 | | Y | 23.479 | θ | 23.76° |
| | $K_y$ | −8.127909 | | Z | 62.324 | | |
| | $K_x$ | 1.633055 | | | | | |
| | AR | $-5.16785 \times 10^{-8}$ | | | | | |
| | BR | $2.0965 \times 10^{-12}$ | | | | | |
| | AP | 0.595412 | | | | | |
| | BP | 0.638703 | | | | | |
| 5 | | −61.610 | | | 1.6792 | | 51.00 |
| | | | | Y | 18.019 | θ | 29.91° |
| | | | | Z | 60.673 | | |
| 6 | $R_y$ | −735.371 | | | 1.6792 | | 51.00 |
| | $R_x$ | ∞ | | Y | −18.782 | θ | −7.75° |
| | $K_y$ | 0 | | Z | 44.607 | | |
| | $K_x$ | 0 | | | | | |
| | AR | $-1.57554 \times 10^{-8}$ | | | | | |
| | BR | $9.32392 \times 10^{-14}$ | | | | | |
| | AP | −1.67996 | | | | | |
| | BP | 0.122856 | | | | | |
| 7 | | −290.903 | | Y | −40.650 | θ | −69.40° |
| | | | | Z | 38.685 | | |
| 8 | | (display device) | | Y | −44.086 | θ | −35.00° |
| | | | | Z | 77.749 | | |
| $\theta_2$ | = | 17.1° | | | | | |
| $\theta_{1r}$ | = | −6.3° | | | | | |
| $\theta_{1h}$ | = | 39.0° | | | | | |
| $\theta_3$ | = | 18.4° | | | | | |
| $\theta_4$ | = | 35.0° | | | | | |
| $r_{y1}/r_{y2}$ | = | 4.85 | | | | | |

Example 10

| 1 | | ∞ (pupil) | 27.648 | | | | |
|---|---|---|---|---|---|---|---|
| 2 | $R_y$ | −127.773 | | | 1.7394 | | 45.06 |
| | $R_x$ | −74.145 | | Y | −39.982 | θ | −19.01° |
| | $K_y$ | 0 | | | | | |
| | $K_x$ | 0 | | | | | |
| | AR | $3.66126 \times 10^{-7}$ | | | | | |
| | BR | $1.819 \times 10^{-11}$ | | | | | |
| | AP | −0.356073 | | | | | |
| | BP | −0.699016 | | | | | |
| 3 | $R_y$ | −81.881 | | | 1.7394 | | 45.06 |
| | $R_x$ | −68.040 | | Y | 28.434 | θ | 39.91° |
| | $K_y$ | −0.111977 | | Z | 37.099 | | |
| | $K_x$ | −0.354898 | | | | | |
| | AR | $5.28817 \times 10^{-12}$ | | | | | |
| | BR | $-3.7857 \times 10^{-12}$ | | | | | |
| | AP | 37.4793 | | | | | |
| | BP | −0.751459 | | | | | |
| 4 | $R_y$ | −127.773 | | | 1.7394 | | 45.06 |
| | $R_x$ | −74.145 | | Y | −39.982 | θ | −19.01° |
| | $K_y$ | 0 | | Z | 27.648 | | |
| | $K_x$ | 0 | | | | | |
| | AR | $3.66126 \times 10^{-7}$ | | | | | |
| | BR | $1.819 \times 10^{-11}$ | | | | | |
| | AP | −0.356073 | | | | | |
| | BP | −0.699016 | | | | | |
| 5 | | −21.067 | 1.567 | | 1.7550 | | 27.60 |
| | | | | Y | −33.151 | θ | −59.68° |
| | | | | Z | 46.009 | | |
| 5 | | −66.347 | | | | | |
| 7 | | (display device) | | Y | −36.167 | θ | −50.37° |
| | | | | Z | 52.703 | | |
| $\theta_2$ | = | 18.3° | | | | | |
| $\theta_{1r}$ | = | −2.8° | | | | | |
| $\theta_{1h}$ | = | 42.9° | | | | | |
| $\theta_3$ | = | 6.5° | | | | | |

-continued

| Surface No. | | Radius of curvature | Surface sepa-ration | | Refractive index (Eccentricity) | | Abbe's No. (Tilt angle) |
|---|---|---|---|---|---|---|---|
| $\theta_4$ | = | 50.4° | | | | | |
| $r_{y1}/r_{y2}$ | = | 1.56 | | | | | |

Example 11

| 1 | | ∞ (pupil) | 25.000 | | | | |
|---|---|---|---|---|---|---|---|
| 2 | | 123.041 | 6.500 | | 1.5940 | | 61.72 |
| | | | | Y | −24.800 | θ | 5.787° |
| 3 | | −594.632 | | | | | |
| 4 | | 239.449 | | | 1.4870 | | 70.40 |
| | | | | Y | −6.355 | θ | 14.22° |
| | | | | Z | 34.191 | | |
| 5 | $R_y$ | −408.357 | | | 1.4870 | | 70.40 |
| | $R_x$ | −239.896 | | Y | −11.547 | θ | 27.47° |
| | $K_y$ | −59.547081 | | Z | 63.131 | | |
| | $K_x$ | 29.562822 | | | | | |
| | AR | $2.289885 \times 10^{-7}$ | | | | | |
| | BR | $8.51773 \times 10^{-11}$ | | | | | |
| | AP | −0.538645 | | | | | |
| | BP | −0.20468 | | | | | |
| 6 | | 239.449 | | | 1.4870 | | 70.40 |
| | | | | Y | −6.355 | θ | 34.19° |
| | | | | Z | 34.191 | | |
| 7 | | 35.931 | | Y | −36.256 | θ | −31.36° |
| | | | | Z | 52.780 | | |
| 8 | | (device display) | | Y | −36.901 | θ | −6.46° |
| | | | | Z | 70.463 | | |
| $\theta_2$ | = | 30.3° | | | | | |
| $\theta_{1r}$ | = | 21.3° | | | | | |
| $\theta_{1h}$ | = | 39.4° | | | | | |
| $\theta_3$ | = | 16.6° | | | | | |
| $\theta_4$ | = | −6.5° | | | | | |
| $r_{y1}/r_{y2}$ | = | −0.58 | | | | | |

As will be clear from the foregoing description, it is possible according to the present invention to provide an image display apparatus which has a wide observation field angle and is extremely small in size and light in weight.

What I claim is:

1. An image display apparatus, comprising an image display device for displaying an image; and an ocular optical system for projecting the image displayed by said image display device and for leading the projected image to an observer's eyeball, said ocular optical system having at least three surfaces, wherein a space formed by said at least three surfaces is filled with a transparent medium having a refractive index larger than 1, said at least three surfaces being, in order from said observer's eyeball toward said image display device, a first surface serving as both a refracting surface and an internally reflecting surface, a second surface which is a reflecting surface of positive power facing said first surface and decentered or tilted with respect to an observer's visual axis, and a third surface which is a refracting surface closest to said image display device, said ocular optical system being arranged such that light rays emitted from said image display device pass through said third surface and are internally reflected by said first surface and further internally reflected by said second surface, and the reflected light rays pass through said first surface and are led to said observer's eyeball, wherein an angle $\Theta_2$ formed between an axial principal ray after being reflected by said second surface and a line normal to said second surface at a point thereon where said axial principal ray is reflected satisfies the following condition:

$$10°≤Θ_2≤40° \quad (1)$$

wherein said image display device is arranged such that the image enters said third surface without forming an intermediate image between said image display device and said third surface, and said first surface is formed from a curved surface configuration having a power so that the light rays emitted from said image display device are given a power when reflected by said first surface and are given a power again when passing through said first surface.

2. An image display apparatus according to claim 1, wherein said angle $θ_2$ satisfies the following condition:

$$10°≤θ_2≤30° \quad (2).$$

3. An image display apparatus according to claim 2, wherein said angle $θ_2$ satisfies the following condition:

$$10°≤θ_2≤20° \quad (3).$$

4. An image display apparatus according to claim 1, wherein said angle $θ_2$ satisfies the following condition:

$$20°≤θ_2≤35° \quad (4).$$

5. An image display apparatus according to claim 1, wherein an angle $θ_{1r}$ formed between the axial principal ray after passing through said first surface of said ocular optical system and a line normal to said first surface at a point thereon where said axial principal ray passes satisfies the following condition:

$$-20°≤θ_{1r}≤25° \quad (5).$$

6. An image display apparatus according to claim 5, wherein said angle $θ_{1r}$ satisfies the following condition:

$$-20°≤θ_{1r}≤7° \quad (6).$$

7. An image display apparatus according to claim 5, wherein said angle $θ_{1r}$ satisfies the following condition:

$$7°≤Θ_{1r}≤25° \quad (7).$$

8. An image display apparatus according to claim 1, wherein an angle θlh formed between the axial principal ray after being internally reflected by said first surface of said ocular optical system and a line normal to said first surface at a point thereon where said axial principal ray is internally reflected satisfies the following condition:

$$35°≤θ_{1h}≤60° \quad (8).$$

9. An image display apparatus according to claim 8, wherein said angle $θ_{1h}$ satisfies the following condition:

$$40°≤θ_{1h}≤60° \quad (9).$$

10. An image display apparatus according to claim 1, wherein an angle $θ_3$ formed between the axial principal ray after passing through said third surface of said ocular optical system and a line normal to said third surface at a point thereon where said axial principal ray passes satisfies the following condition:

$$-20°≤θ_3≤20° \quad (10).$$

11. An image display apparatus according to claim 10, wherein said angle $θ_3$ satisfies the following condition:

$$-12°≤θ_3≤12° \quad (11).$$

12. An image display apparatus according to claim 11, wherein said angle $θ_3$ satisfies the following condition:

$$-5°≤θ_3≤5° \quad (12).$$

13. An image display apparatus, comprising:

an image display device for displaying an image; and an ocular optical system for projecting the image displayed by said image display device and for leading the projected image to an observer's eyeball, said ocular optical system having at least three surfaces, wherein a space formed by said at least three surfaces is filled with a transparent medium having a refractive index larger than 1, said at least three surfaces being, in order from said observer's eyeball toward said image display device, a first surface serving as both a refracting surface and an internally reflecting surface, a second surface which is a reflecting surface of positive power facing said first surface and decentered or tilted with respect to an observer's visual axis, and a third surface which is a refracting surface closest to said image display device, said ocular optical system being arranged such that light rays emitted from said image display device pass through said third surface and are internally reflected by said first surface and further internally reflected by said second surface, and the reflected light rays pass through said first surface and are led to said observer's eyeball, wherein an angle $Θ_4$ formed between a line normal to said image display device and said observer's visual axis satisfies the following condition:

$$-20°≤Θ_4≤80° \quad (13)$$

wherein said image display device is arranged such that the image enters said third surface without forming an intermediate image between said image display device and said third surface, and said first surface is formed from a curved surface configuration having a power so that the light rays emitted from said image display device are given a power when reflected by said first surface and are given a power again when passing through said first surface.

14. An image display apparatus according to claim 13, wherein said angle $θ_4$ satisfies the following condition:

$$20°≤θ_4≤60° \quad (14).$$

15. An image display apparatus according to claim 13, wherein said angle $θ_4$ satisfies the following condition:

$$-20°≤θ_4≤20° \quad (15).$$

16. An image display apparatus according to claim 13, wherein said angle $θ_4$ satisfies the following condition:

$$40°≤θ_4≤60° \quad (16).$$

17. An image display apparatus, comprising:

an image display device for displaying an image; and an ocular optical system for projecting the image displayed by said image display device and for leading the projected image to an observer's eyeball, said ocular optical system having at least three surfaces, wherein a space formed by said at least three surfaces is filled with a transparent medium having a refractive index larger than 1, said at least three surfaces being, in order from said observer's eyeball toward said image display device, a first surface serving as both a refracting surface and an internally reflecting surface, a second surface which is a reflecting surface of positive power facing said first surface and decentered or tilted with respect to an observer's visual axis, and a third surface which is a refracting surface closest to said image display device, said ocular optical system being arranged such that light rays emitted from said image display device pass through said third surface and are internally reflected by said first surface and further internally reflected by said second surface, and the reflected light rays pass through said first surface and are led to said observer's eyeball, wherein an angle $\Theta_2$ formed between an axial principal ray after being reflected by said second surface and a line normal to said second surface at a point thereon where said axial principal ray is reflected satisfies the following condition:

$$10°\leq\Theta_2\leq40° \quad (1)$$

and, wherein the following condition is satisfied:

$$-10\leq r_{y1} r_{y2}\leq 10 \quad (17)$$

where $r_{y1}$, is a radius of curvature of said first surface of said ocular optical system, and $r_{y2}$ is a radius of curvature of said second surface.

18. An image display apparatus according to claim 17, wherein said curvature radii $r_{y1}$ and $r_{y2}$ satisfy the following condition:

$$-7\leq r_{y1}/r_{y2}\leq 7 \quad (18).$$

19. An image display apparatus according to claim 18, wherein said curvature radii $r_{y1}$ and $r_{y2}$ satisfy the following condition:

$$-4\leq r_{y1}/r_{y2}\leq 4 \quad (19).$$

20. An image display apparatus according to claim 1, wherein a length W of a horizontal side of said ocular optical system as viewed from an observer's side satisfies the following condition:

$$20 \text{ millimeters}\leq W\leq 70 \text{ millimeters} \quad (20).$$

21. An image display apparatus according to claim 20, wherein said length W satisfies the following condition:

$$30 \text{ millimeters}\leq W\leq 70 \text{ millimeters} \quad (21).$$

22. An image display apparatus according to claim 21, wherein said length W satisfies the following condition:

$$40 \text{ millimeters}\leq W\leq 70 \text{ millimeters} \quad (22).$$

23. An image display apparatus according to claim 1, wherein a horizontal length Wh of said ocular optical system from the observer's visual axis to a nose-side end thereof as viewed from an observer's side satisfies the following condition:

$$5 \text{ millimeters}\leq Wh\leq 35 \text{ millimeters} \quad (23).$$

24. An image display apparatus according to claim 23, wherein said length Wh satisfies the following condition:

$$7 \text{ millimeters}\leq Wh\leq 35 \text{ millimeters} \quad (24).$$

25. An image display apparatus according to claim 24, wherein said length wh satisfies the following condition:

$$10 \text{ millimeters}\leq Wh\leq 35 \text{ millimeters} \quad (25).$$

26. An image display apparatus according to claim 1, wherein the curved surface configuration of said first surface is a rotationally asymmetric surface configuration.

27. An image display apparatus according to claim 13, wherein the curve surface configuration of said first surface is a rotationally asymmetric surface configuration.

28. An image display apparatus according to claim 26, wherein the curved surface figuration of said first surface is formed such that a configuration in an XZ-axis plane and a configuration in a YZ-axis plane are different from each other.

29. An image display apparatus according to claim 27, wherein the curved configuration of said first surface is formed such that a configuration in an XZ-axis plane and a configuration in a YZ-axis plane are different from each other.

30. An image display apparatus according to claim 28, wherein the curved surface configuration of said first surface is an anamorphic aspherical surface configuration.

31. An image display apparatus according to claim 29, wherein the curved surface configuration of said first surface is an anamorphic aspherical surface configuration.

32. An image display apparatus according to claim 26, wherein said image display device is positioned to face said third surface.

33. An image display apparatus according to claim 27, wherein said image display device is positioned to face said third surface.

34. An image display apparatus according to claim 26, wherein said second surface is formed as a reflecting surface, said reflecting surface being arranged such that a side of said reflecting surface closer to said first surface is in contact with said transparent medium, and a side of said reflecting surface remote from said first surface is in contact with an air medium.

35. An image display apparatus according to claim 27, wherein said second surface is formed as a reflecting surface, said reflecting surface being arranged such that a side of said reflecting surface closer to said first surface is in contact with said transparent medium, and a side of said reflecting surface remote from said first surface is in contact with an air medium.

36. An image display apparatus according to claim 26, wherein said ocular optical system comprises a prism consisting of said first surface, said second surface, and said third surface.

37. An image display apparatus according to claim 27, wherein said ocular optical system comprises a prism consisting of said first surface, said second surface, and said third surface.

38. An image display apparatus according to claim 36, wherein said ocular optical system comprises said prism and a lens which is disposed closer to the observer's eyeball than said first surface of said prism.

39. An image display apparatus according to claim 37, wherein said ocular optical system comprises said prism and a lens which is disposed closer to the observer's eyeball than said first surface of said prism.

* * * * *